(12) United States Patent
Ito et al.

(10) Patent No.: US 8,786,796 B2
(45) Date of Patent: Jul. 22, 2014

(54) DISPLAY DEVICE

(75) Inventors: Keita Ito, Osaka (JP); Eiji Iwata, Osaka (JP); Masahiro Ohtake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1086 days.

(21) Appl. No.: 12/740,626

(22) PCT Filed: Oct. 27, 2008

(86) PCT No.: PCT/JP2008/069445
§ 371 (c)(1),
(2), (4) Date: Apr. 29, 2010

(87) PCT Pub. No.: WO2009/057550
PCT Pub. Date: May 7, 2009

(65) Prior Publication Data
US 2010/0253874 A1    Oct. 7, 2010

(30) Foreign Application Priority Data

Oct. 29, 2007 (JP) ................................ 2007-280815
Feb. 7, 2008 (JP) ................................ 2008-027900
Sep. 30, 2008 (JP) ................................ 2008-255066

(51) Int. Cl.
*G02F 1/1333*    (2006.01)
(52) U.S. Cl.
USPC ........................................... 349/58; 349/60
(58) Field of Classification Search
USPC ................................................. 349/58, 60
See application file for complete search history.

(56) References Cited

U.S. PATENT DOCUMENTS

| | | | |
|---|---|---|---|
| 2001/0036057 A1 | 11/2001 | Fukuyoshi | |
| 2002/0080297 A1 | 6/2002 | Sung | |
| 2004/0189889 A1* | 9/2004 | Nitto et al. | 349/58 |
| 2006/0209227 A1 | 9/2006 | Miyamoto | |
| 2008/0239634 A1 | 10/2008 | Nakao et al. | |

FOREIGN PATENT DOCUMENTS

| | | |
|---|---|---|
| JP | 8-271867 A | 10/1996 |
| JP | 10-123971 A | 5/1998 |
| JP | 10-207630 A | 8/1998 |
| JP | 2001-305985 A | 11/2001 |
| JP | 2002-116709 A | 4/2002 |
| JP | 2002-215061 A | 7/2002 |
| JP | 2004-70657 A | 3/2004 |
| JP | 2004-251938 A | 9/2004 |
| JP | 3110997 U | 7/2005 |
| JP | 2006-201364 A | 8/2006 |
| JP | 2006-215492 A | 8/2006 |

(Continued)

Primary Examiner — Wen-Ying P Chen
(74) Attorney, Agent, or Firm — Birch, Stewart, Kolasch & Birch, LLP

(57) ABSTRACT

In a structure for holding a display panel disposed within a cabinet, which includes a frame part positioned on one side of a display face of the display panel; a peripheral part positioned around the display panel; and a rear part covering the other face side of the display panel, from both sides by the frame part and a holding member supported by the peripheral part, a projecting portion projects on an inner face portion of the frame part in a position on an outer peripheral side of a rim portion of the display panel and the holding member so as to extend from the side of the display face of the display panel toward the opposite side of the display face, and a reinforcing portion for coupling the inner face portion of the projecting portion and the inner face portion of the frame part is provided.

5 Claims, 27 Drawing Sheets

(56) References Cited

FOREIGN PATENT DOCUMENTS

| | | |
|---|---|---|
| JP | 2006-215512 A | 8/2006 |
| JP | 2006-235425 A | 9/2006 |
| JP | 2008-203319 A | 9/2008 |
| RU | 2 158 434 C1 | 10/2000 |
| WO | WO 2006/092954 A1 | 9/2006 |

* cited by examiner

F I G. 3
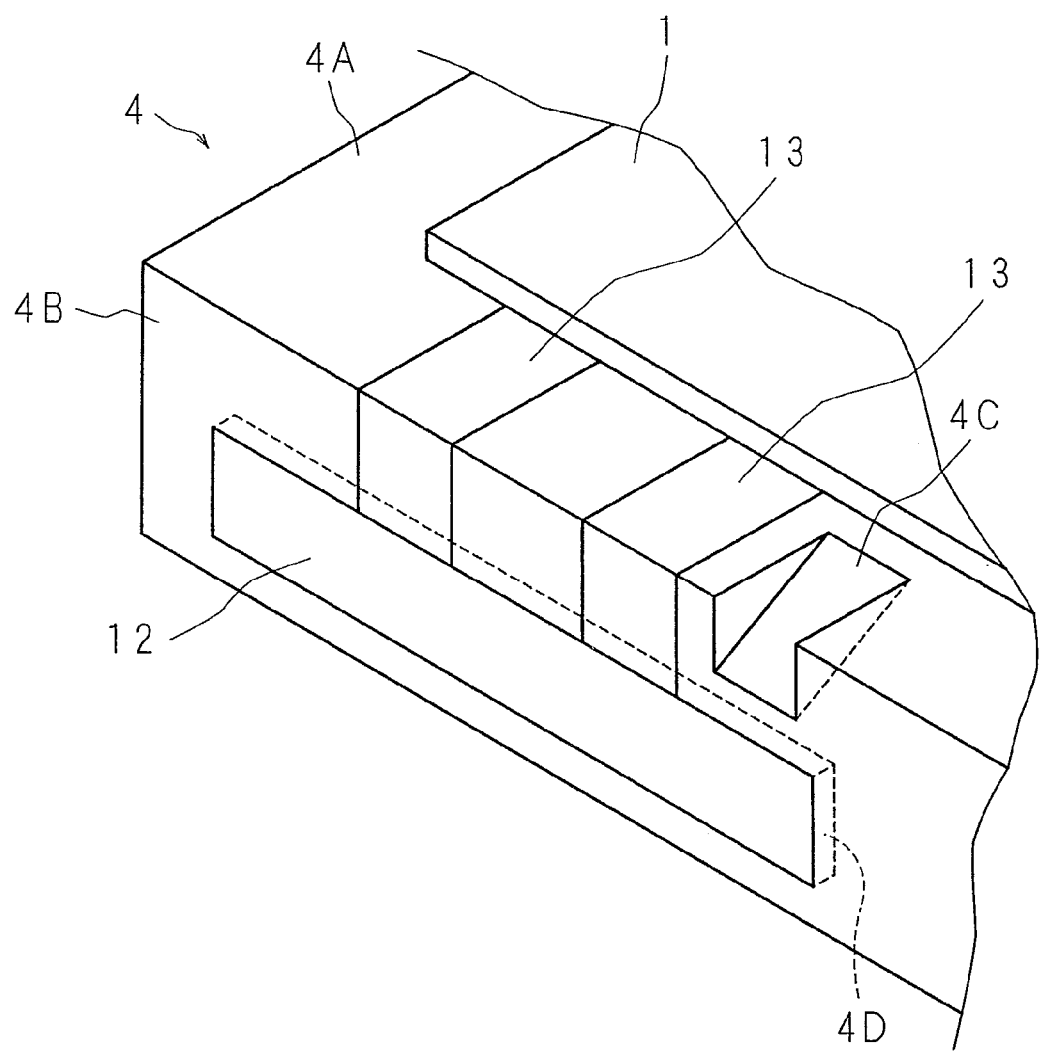

F I G. 1 3
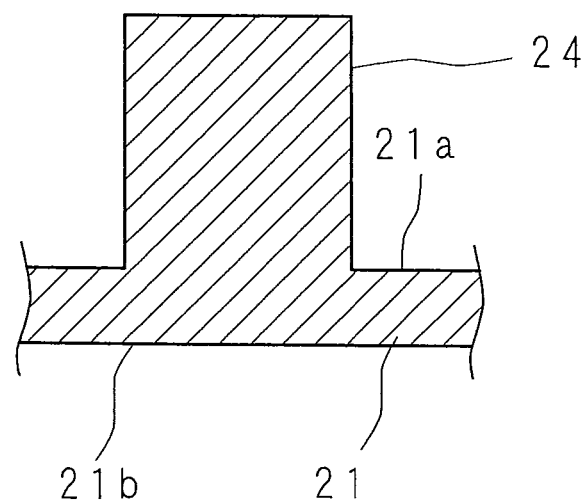

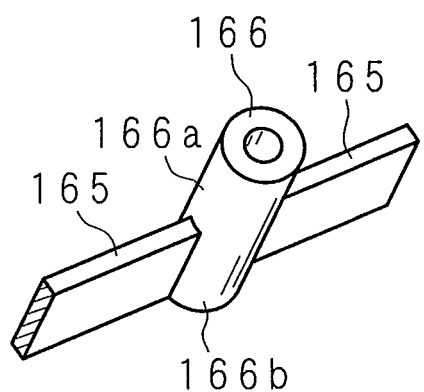
F I G. 24

DISPLAY DEVICE

This application is the national phase under 35 U.S.C. §371 of PCT International Application No. PCT/JP2008/069445 which has an International filing date of Oct. 27, 2008 and designated the United States of America.

BACKGROUND

1. Technical Field

The present invention relates to a display device having a structure for holding a display panel disposed within a cabinet.

2. Description of Related Art

A liquid crystal display device such as a liquid crystal television, that is, an example of a display device having a structure for holding a display panel within a cabinet, is characterized by its small weight and small thickness, and in a conventional liquid crystal display device, a metal frame body designated as a bezel is used for holding a rim portion of a liquid crystal panel from a front side (a side of a display face) and a plastic frame body is used for holding the rim portion of the liquid crystal panel from a rear side (a side opposite to the display face) (See Japanese Patent Application Laid Open No. 2006-201364, Japanese Patent Application Laid Open No. 2006-215492 and Japanese Patent Application Laid Open No. 2006-215512). The bezel disposed on the front side of the liquid crystal panel is used for securing the strength of the liquid crystal panel in a state where it is incorporated into the liquid crystal display device as well as for securing the strength required in conveying the liquid crystal panel between factories or within a factory during the fabrication of the liquid crystal display device.

At this point, the structure of the liquid crystal display device using the metal frame body (bezel) will be specifically described with reference to FIG. 4. A diagram disposed in an upper left portion of FIG. 4 is a side cross-sectional view illustrating a principal part of a liquid crystal display device using a bezel 15. A liquid crystal panel 1 is disposed within a plastic cabinet 2 securing the exterior and having external design, and the cabinet 2 includes a frame part 21 disposed on the front side of the bezel 15 and having an opening in the center; a peripheral part 22 connected to the outer periphery of the frame part 21 and extended in the backward direction to be disposed around the liquid crystal panel 1; and a rear part 23 connected to the peripheral part 22 so as to cover the rear side of the liquid crystal panel 1. The peripheral part 22 has a large thickness, and a front edge portion of the rear part 23 is fit in a peripheral groove formed on a rear edge side of the peripheral part 22, so as to connect the peripheral part 22 and the rear part 23 to each other. The bezel 15 has a substantially L-shaped cross section and includes a front frame part 15A disposed on the front side of the liquid crystal panel 1 for holding a front face rim portion of the liquid crystal panel 1 and a peripheral frame part 15B bent at an outer peripheral end of the front frame part 15A so as to extend in the backward direction.

A plastic frame body 4 having an L-shaped cross section is disposed on the rear side of the liquid crystal panel 1, and the frame body 4 includes a front frame part 4A holding a rear face rim portion of the liquid crystal panel 1 and a peripheral frame part 4B bent at an outer peripheral end of the front frame part 4A so as to extend in the backward direction. Furthermore, an optical sheet 11 and a backlight chassis 6 for holding backlights 10 are disposed behind the frame body 4 by using a stepped frame 7. The backlight chassis 6 is connected to and held on the peripheral part 22 of the cabinet 2 through a holding frame 9. The peripheral frame part 15B of the bezel 15 and a rear face portion of the backlight chassis 6 (or the peripheral frame part 15B of the bezel 15 and the peripheral frame part 4B of the frame body 4) are connected to each other by using coupling means such as a screw not shown, so that the rim portion of the liquid crystal panel 1 may be held from the front and rear sides by the front frame part 15A of the bezel 15 and the front frame part 4A of the frame body 4. Furthermore, a peripheral side of the liquid crystal panel 1 is covered with the peripheral frame part 15B of the bezel 15 and the peripheral frame part 4B of the frame body 4, so as to prevent adhesion on the rear face of the liquid crystal panel 1 of dust entering the cabinet through radiating holes or the like formed on the cabinet 2.

In the case where a liquid crystal panel is held to be sandwiched between frame bodies disposed in front of and behind the liquid crystal panel as in described in Japanese Patent Application Laid Open No. 2006-201364, Japanese Patent Application Laid Open No. 2006-215492 and Japanese Patent Application Laid Open No. 2006-215512, however, the dimension in the depth direction is increased correspondingly to a space for placing the frame bodies (their front frame parts in particular), which restricts thickness reduction of a liquid crystal display device, and furthermore, when a metal bezel is used as the front frame body, the weight is increased correspondingly to the weight of the bezel. Therefore, in order to attain a smaller thickness and a smaller weight, a liquid crystal display device in which a bezel is not used as a front frame body but a rim portion of a liquid crystal panel is directly pressed from a side of a display face by a frame part of a cabinet so as to sandwich the rim portion between the frame part and a rear frame body has been developed (see Japanese Patent Application Laid Open No. 2006-235425).

SUMMARY

In the liquid crystal display device described in Japanese Patent Application Laid Open No. 2006-235425, when a metal bezel is not used and a liquid crystal panel is directly held by a frame part of a plastic cabinet, this panel holding structure is degraded in the rigidity, and hence, in order to secure the rigidity of the frame part of the cabinet, a honeycomb structure including a large number of projecting ribs in the shape of a hexagonal column is formed on the inner wall of the frame part. In other words, since the honeycomb structure for reinforcement is formed on the inner wall of the frame part, the dimension in the depth direction is increased correspondingly to the height of the ribs of the hexagonal column shape, and it is apprehended that extension in the outward direction may be increased correspondingly to the area where the honeycomb structure is formed, and thus, there still is room for development of this liquid crystal display device from the viewpoint of thickness reduction and frame size reduction. Also in other types of thin displays (display devices) apart from a liquid crystal display device, such as a PDP (plasma display panel) or an organic EL (electroluminescence), there are similar demands for further thickness reduction and frame size reduction. Furthermore, in the case where a frame body (bezel) disposed in front of a liquid crystal panel and bent at the outer peripheral end to extend in the backward direction so as to cover a peripheral portion of the liquid crystal panel is not used, the dust-proof property on the peripheral side of the liquid crystal panel is lowered, which is desired to be improved.

The present invention was devised in consideration of the aforementioned circumstances, and an object of the invention is to provide a display device, having a structure for directly holding a rim portion of a display panel by a frame part of a cabinet from a display face side without using a bezel, which allows the securement of the rigidity of the frame part while realizing further thickness reduction and frame size reduction.

Another object of the invention is to provide a display device, having a structure for directly holding a rim portion of a display panel by a frame part of a cabinet from a display face side, which allows the securement of the rigidity of the frame part and the improvement of the dust-proof property on the peripheral side of the display panel while realizing further thickness reduction.

A display device of this invention is a display device comprising: a cabinet including a frame part being disposed on a first face side corresponding to a display face of a display panel and having an opening, a peripheral part connected to an outer periphery of the frame part and positioned around the display panel, and a rear part connected to the peripheral part and covering a second face side of the display panel; the display panel disposed within the cabinet and held from both sides thereof by the frame part and a holding member supported on the peripheral part or the rear part; a projecting portion that projects inside the frame part, disposed outside a rim portion of the display panel and the holding member and extends from the first face side toward the second face side; and a reinforcing portion that couples the projecting portion with an interior of the frame part.

With the display device of this invention, the rim portion of the display panel is held by the frame part of the cabinet from the first face side (the display face side) and a conventionally used metal bezel is omitted, and therefore, the dimension in the depth direction is reduced correspondingly to a space for placing a front frame part of the bezel conventionally used for holding the rim portion of the display panel from the display face side, and extension in the outward direction is reduced correspondingly to a space for placing a peripheral frame part extending from the outer peripheral end of the front frame part toward the second face side (the opposite side to the display face) of the display panel. In this display device, owing to the projecting portion projecting on the inner face portion of the frame part of the cabinet in the position on the outer peripheral side of the rim portion of the display panel and the holding member and extending in the direction from the first face side toward the second face side, the rigidity of the frame part of the cabinet is increased, and in addition, owing to the reinforcing portion coupling the projecting portion with the interior of the frame part of the cabinet, the holding force of an integral structure of the frame part of the cabinet and the projecting portion is increased, and hence, the rigidity of the projecting portion is increased and the rigidity of the frame part of the cabinet is further increased.

A display device of this invention is a display device comprising: a cabinet including a frame part being disposed on a first face side corresponding to a display face of a display panel and having an opening, a peripheral part connected to an outer periphery of the frame part and positioned around the display panel, and a rear part connected to the peripheral part and covering a second face side of the display panel; the display panel disposed within the cabinet and held from both sides thereof by the frame part and a holding member supported on the peripheral part or the rear part; a projecting portion that projects inside the frame part, disposed outside a rim portion of the display panel and the holding member, extends from the first face side toward the second face side, and has a cavity inside.

With the display device of this invention, the rim portion of the display panel is held by the frame part of the cabinet from the first face side (the display face side) and a conventionally used metal bezel is omitted, and therefore, the dimension in the depth direction is reduced correspondingly to a space for placing a front frame part of the bezel conventionally used for holding the rim portion of the display panel from the display face side, and extension in the outward direction is reduced correspondingly to a space for placing a peripheral frame part extending from the outer peripheral end of the front frame part toward the second face side (the opposite side to the display face) of the display panel. In this display device, owing to the projecting portion projecting on the inner face portion of the frame part of the cabinet in the position on the outer peripheral side of the rim portion of the display panel and the holding member and extending in the direction from the first face side toward the second face side, the rigidity of the frame part of the cabinet is increased, and in addition, since the projecting portion has the cavity inside, weight increase may be controlled even when, for example, the width of the projecting portion is increased for increasing the mechanical resistance force. Furthermore, when the projecting portion is fabricated by injection molding integrally with the frame part of the cabinet, the cavity exhibits effects to prevent occurrence of "molding sink" and to reduce cooling time.

A display device of this invention is characterized by further comprising a reinforcing portion that couples the projecting portion with an interior of the frame part.

With this invention, owing to the projecting portion having the cavity inside, the mechanical resistance force is increased while controlling the weight increase of the projecting portion, and in addition, owing to the reinforcing portion coupling the projecting portion and the interior of the frame part of the cabinet with each other, the holding force of the integral structure of the frame part of the cabinet and the projecting portion is increased, so as to further increase the rigidity of the frame part of the cabinet.

A display device of the invention is characterized in that the projecting portion extends in a direction substantially perpendicular to an inner face of the frame part, and the reinforcing portion is a plate portion substantially perpendicular to the projecting portion and the inner face of the frame part.

With this invention, when the integral structure of the frame part of the cabinet and the projecting portion is deformed so as to cause relative displacement between the projecting portion and the frame part, the plate portion extending substantially perpendicular to the projecting portion and the inner face of the frame part exhibits a strong resistance force against the relative displacement, and hence, the deformation of the integral structure of the frame part of the cabinet and the projecting portion is effectively prevented. Furthermore, even when the plate portion has a small thickness, it exhibits a strong resistance force in its extending direction. As a result, while avoiding size increase of the reinforcing portion by using the plate portion, the holding force of the integral structure of the frame part of the cabinet and the projecting portion and the rigidity of the projecting portion and the frame part of the cabinet are effectively increased.

A display device of the invention is characterized in that the plate portion has a cavity inside.

With this invention, since the plate portion has the cavity inside, the weight increase may be controlled while securing the mechanical resistance force of the plate portion even when, for example, the width of the plate portion is increased for increasing the mechanical resistance force. Furthermore, when the plate portion is fabricated by injection molding integrally with the frame part of the cabinet and the projecting portion, the cavity exhibits effects to prevent occurrence of "molding sink" and to reduce cooling time.

A display device of the invention is characterized in that the reinforcing portion is provided inside the projecting portion.

With this invention, the reinforcing portion does not extend outward beyond the projecting portion, and hence, the increase of the extension of the cabinet in the outward direction otherwise caused by the reinforcing portion may be avoided.

A display device of the invention is characterized in that the cavity is opened outside the frame part.

With this invention, the projecting portion and the plate portion positioned inside the frame part of the cabinet have, inside, the cavities opened on the outer face side of the frame part and are connected to each other at their ends farther from the outer face of the frame part, and hence, lowering of the rigidity derived from the cavities may be controlled. On the contrary, if the cavities are opened on the inner face side of the frame part, the projecting portion and the plate portion are disconnected from each other at the ends farther from the outer face of the frame part, and hence, it is apprehended that the lowering of the rigidity derived from the cavities may be increased.

A display device of this invention is characterized by further comprising a cover attached on a face of the frame part opposite to the display panel side, wherein the cover includes a convex portion to be fit in the cavity.

With this invention, the cavity opened outside the frame part is covered with the cover attached on the face of the frame part opposite to the display panel side, resulting in improving good appearance of the device. When the convex portion provided on the cover is fit in the cavity of the plate portion or the projecting portion opened outside the frame part, the cover may be easily aligned, and a force of the frame part for holding the cover may be improved.

A display device of this invention is characterized in that the projecting portion is an annular projection provided continuously outside the rim portion of the display panel.

With this invention, high rigidity may be secured by the annular projection continuous over the entire periphery. Furthermore, the position for holding the display panel is restrained by the annular projection so as not to be shifted to the outer peripheral side of the frame part, and furthermore, when the position of the annular projection is appropriately selected, the position of the display panel against the frame part may be freely set.

A display device of this invention is characterized in that the projecting portion is a plurality of projections arranged at intervals outside the rim portion of the display panel.

With this invention, the position for holding the display panel is restrained by the plural projections arranged in the shape of a ring so as not to be shifted to the outer peripheral side of the frame part, and furthermore, when the positions of the plural projections are appropriately selected, the position of the display panel against the frame part may be freely set.

A display device of this invention is characterized in that the holding member is a frame body having an opening for transmitting light for irradiating the display panel and holding the rim portion of the display panel from the second face side.

With this invention, the second face side (the opposite side to the display face) of the display panel may be held by using the frame body having the opening for transmitting light for irradiating the display panel, and the frame body holds the rim portion of the display panel from the opposite side to the display face.

A display device of this invention is characterized in that the frame body includes, in an outer peripheral portion thereof, a recess portion to be engaged with the plate portion.

With this invention, when the plate portion positioned inside the projecting portion and extending substantially perpendicular to the projecting portion and the inner face of the frame part is fit in the recess portion formed in the outer peripheral portion of the frame body positioned inside the projecting portion, the frame body having the opening for transmitting the irradiating light is strongly coupled with the frame part and the projecting portion, and therefore, the rigidity of the frame body is increased as well as the rigidity of the integral structure of the frame part and the projecting portion is increased.

A display device of this invention is characterized in that the reinforcing portion includes a recess portion recessed in a direction substantially perpendicular to an inner face of the frame part, and the frame body includes, in an outer peripheral portion thereof, a convex portion to be engaged with the recess portion.

With this invention, when the recess portion provided on the reinforcing portion disposed inside the projecting portion is fit in the convex portion disposed on the outer peripheral portion of the frame body positioned inside the projecting portion, the frame body having the opening for transmitting the irradiating light is strongly coupled with the frame part and the projecting portion, and therefore, the rigidity of the frame body is increased as well as the rigidity of the integral structure of the frame part and the projecting portion is increased.

A display device of this invention is characterized in that the frame body includes, in an outer peripheral portion thereof, a receiving portion for a circuit board used for driving the display panel.

With this invention, the circuit board used for driving the display panel is placed on the receiving portion provided in the outer peripheral portion of the frame body holding the opposite side to the display face of the display panel, and the circuit board is electrostatically shielded and protected by the projecting portion disposed on the outer peripheral side of the frame body.

A display device of the invention is a display device comprising: a cabinet including a frame part being disposed on a first face side corresponding to a display face of a display panel and having an opening, a peripheral part connected to an outer periphery of the frame part and positioned around the display panel, and a rear part connected to the peripheral part and covering a second face side of the display panel; the display panel disposed within the cabinet, and held from both sides thereof by the frame part and a holding member supported on the peripheral part or the rear part; a projecting portion that is provided in a ring shape integrally inside the frame part on an outer peripheral side of the display panel and extends from the first face side toward the second face side; and coupling portions integrally formed on the projecting portion in a plurality of circumferential positions thereof, wherein the holding member includes coupled portions to be coupled to the coupling portions.

With this invention, the projecting portion disposed in the shape of a ring outside the display panel and extending in the direction from the first face side of the display panel toward the second face side is integrally formed inside the frame part, and the coupling portions are integrally formed in the plural circumferential positions of the projection portion, and therefore, the rigidity of the frame part of the cabinet, and the rigidity of a panel module in its turn, may be increased, resulting in protecting the display panel. Furthermore, since the projecting portion is disposed in the shape of a ring outside the display panel and the holding member is coupled with the coupling portions formed integrally with the projecting portion, entrance of external dust to a side of the display panel may be controlled by the projecting portion, so as to improve the dust-proof property on the peripheral side of the display panel.

A display device of this invention is characterized in that each of the coupling portions is a cylindrical boss, each of the coupled portions has an insertion hole corresponding to a hole of the cylindrical boss, and a male screw inserted into the insertion hole and screwed into the cylindrical boss is provided.

With this invention, since the cylindrical bosses are integrally formed in the plural circumferential positions of the projection provided in the shape of a ring, the rigidity of the projecting portion may be increased by the cylindrical bosses, and the rigidity of the frame part of the cabinet formed integrally with the projecting portion may be further increased.

A display device of this invention is characterized in that each of the coupling portions is a flexible engaging click to be engaged with each of the coupled portions.

With this invention, since the frame part may be coupled with the holding member by engaging the flexible engaging clicks with the coupled portions, the workability in the assembly of the frame part of the cabinet, and the workability in the assembly of the whole display device in its turn, may be improved and the cost may be reduced.

A display device of this invention is characterized in that the holding member includes: an annular plate portion opposing the second face side of the rim portion of the display panel and having through holes in a plurality of circumferential positions; and a frame portion extending from an outer edge of the annular plate portion in a direction from the first face side of the display panel toward the second face side, and each of the coupling portions has an insertion portion extending from the projecting portion in the direction from the first face side of the display panel toward the second face side to be inserted into each of the through holes.

With this invention, the insertion portion of the coupling portion extending in the direction from the first face side of the display panel toward the second face side is inserted into each of the through holes of the holding member formed in the plural circumferential positions of the annular plate portion opposing the second face side of the rim portion of the display panel, and the holding member is coupled with this insertion portion, and therefore, the rigidity of the projecting portion and the coupling portion may be increased, and the rigidity of the frame part of the cabinet formed integrally with the projecting portion may be further increased.

According to the display device of this invention, in the structure for directly holding a rim portion of a display panel by a frame part of a cabinet from a display face side in order to omit a bezel conventionally used for holding the display face side of the display panel so as to reduce the dimension in the depth direction and reduce extension in the outward direction correspondingly to a space for placing the bezel, a projecting portion projecting inside the frame part of the cabinet to be positioned outside the rim portion of the display panel and a holding member and a reinforcing portion for coupling the projecting portion and the interior of the frame part are provided, so that the rigidity of the cabinet with a small weight made of, for example, a plastic molded component, may be increased and the strength for holding the display panel and the strength as a product may be increased. Therefore, differently from a display device having a reinforcing structure formed on the inner portion of the frame part, the display device allows the securement of the rigidity of the frame part while realizing further thickness reduction and frame size reduction.

According to the display device of this invention, in the structure for directly holding a rim portion of a display panel by a frame part of a cabinet from a display face side in order to omit a bezel conventionally used for holding the display face side of the display panel so as to reduce the dimension in the depth direction and reduce extension in the outward direction correspondingly to a space for placing the bezel, a projecting portion projecting on an inner portion of the frame part of the cabinet to be positioned on the outer peripheral side of the rim portion of the display panel and a holding member is provided, so that the rigidity of the cabinet with a small weight made of, for example, a plastic molded component, may be increased and the strength for holding the display panel and the strength as a product may be increased. Therefore, differently from a display device having a reinforcing structure formed on the inner portion of the frame part, the display device allows the securement of the rigidity of the frame part by increasing the mechanical resistance force due to the increase of the width of the projecting portion while realizing further thickness reduction and frame size reduction and controlling increase in the weight of the projecting portion by forming a cavity inside the projecting portion.

Furthermore, according to the display device of this invention, since the reinforcing portion for coupling the projecting portion having the cavity inside with the inner portion of the frame part of the cabinet is provided, the mechanical resistance force is increased while controlling the weight increase of the projecting portion as well as the holding force of the integral structure of the frame part of the cabinet and the projecting portion may be increased so as to further increase the rigidity of the frame part of the cabinet.

According to the display device of the invention, the reinforcing portion includes the plate portion extending substantially perpendicular to the projecting portion, which extends in the direction substantially perpendicular to the inner face of the frame part of the cabinet, and the inner face of the frame part, and therefore, the display device effectively allows the improvement of the holding force of the integral structure of the frame part of the cabinet and the projecting portion and the rigidity of the projecting portion and the frame part of the cabinet while controlling size increase of the reinforcing portion.

According to the display device of the invention, the display device may control weight increase by the cavity formed inside the plate portion while increasing the resistance force due to the increase of the width of the plate portion. Furthermore, when the plate portion is fabricated by injection molding integrally with the frame part of the cabinet and the projecting portion, occurrence of "molding sink" is effectively prevented and cooling time is effectively reduced.

According to the display device of this invention, since the reinforcing portion is disposed on the inner peripheral side of the position of the projecting portion, the increase in the extension in the outward direction of the cabinet may be avoided, and hence the display device allows frame size reduction.

According to the display device of this invention, since the cavity is opened outside the frame part, the display device allows the rigidity by a structure for connecting the projecting portion and the plate portion at their ends farther from the outside of the frame part.

According to the display device of the invention, since the convex portion to be fit in the cavity of the plate portion or the projecting portion is provided on the cover attached on the face opposite to the display panel side of the frame part, while improving the good appearance by covering the cavity with the cover, the cover may be easily aligned by fitting the convex portion of the cover in the cavity of the plate portion or the projecting portion opened outside the frame part of the cabinet, and the force for holding the cover by the frame part may be increased.

According to the display device of the invention, owing to the annular projection provided on the entire periphery on the outer peripheral side of the rim portion of the display panel, the projecting portion having high rigidity may be attained. Also owing to the annular projection, the position for holding the display panel may be restrained so as not to be shifted toward the outer peripheral side of the frame part. Furthermore, when the position of the annular projection is changeable, design freedom in the arrangement of the display panel against the frame part of the cabinet may be secured.

According to the display device of this invention, owing to the plural projections arranged in the shape of a ring at intervals in the circumferential direction on the outer peripheral side of the rim portion of the display panel, the position for holding the display panel may be restrained so as not to be shifted toward the outer peripheral side of the frame part. Furthermore, when the positions of the plural projections are changeable, the design freedom in the arrangement of the display panel against the frame part of the cabinet may be secured.

According to the display device of this invention, in the case where the display panel is irradiated with light for a display operation as in a liquid crystal display device, where the frame part of the cabinet is used for holding the display face side of the display panel and the frame body having an opening for transmitting the irradiating light is used for holding the side opposite to the display face side of the display panel, the rigidity of the frame part may be secured while realizing thickness reduction and frame size reduction by the projecting portion provided on the frame part of the cabinet and the reinforcing portion.

According to the display device of the invention, when the plate portion of the frame part is fit in the recess portion provided on the outer peripheral portion of the frame body, the rigidity of the frame body, which is lowered due to the opening for transmitting the irradiating light, may be increased so as to secure the force for holding the display panel.

Furthermore, when the recess portion of the reinforcing portion is fit in the convex portion provided on the outer peripheral portion of the frame body, the rigidity of the frame body, which is lowered due to the opening for transmitting the irradiating light, may be increased so as to secure the force for holding the display panel.

According to the display device of the invention, since the circuit board used for driving the display panel is mounted on the receiving portion provided on the outer peripheral portion of the frame body, the thickness reduction and the frame size reduction may be secured and the circuit board may be protected as compared with the case where, for example, the circuit board is mounted on a member other than the frame body.

According to the display device of the invention, owing to the projecting portion provided in the shape of a ring outside the display panel and the coupling portions integrally formed in the plural circumferential positions of the projecting portion, the rigidity of the frame part of the cabinet, and the rigidity of the panel module in its turn, may be increased. In addition, since the projecting portion is provided in the shape of a ring around the display panel and the coupling portions integrally formed with the projecting portion are coupled with the holding member, the entrance of external dust to the side of the display panel may be controlled by the projecting portion, resulting in improving the dust-proof property on the peripheral side of the display panel.

The above and further objects and features will more fully be apparent from the following detailed description with accompanying drawings.

BRIEF DESCRIPTION OF THE DRAWINGS

FIG. 3 is a perspective view of a principal part of the liquid crystal display device of FIG. 1.

FIG. 13 is a cross-sectional view taken on line XIII-XIII of FIG. 11.

FIG. 24 is a perspective view illustrating a structure of a rib and a cylindrical boss of the liquid crystal display device of Embodiment 7 of the invention.

The above and further objects and features will more fully be apparent from the following detailed description with accompanying drawings.

DETAILED DESCRIPTION

Now, preferred embodiments where the display device of the invention is applied to a liquid crystal display device will be described with reference to the accompanying drawings.
Embodiment 1

Figure 1:
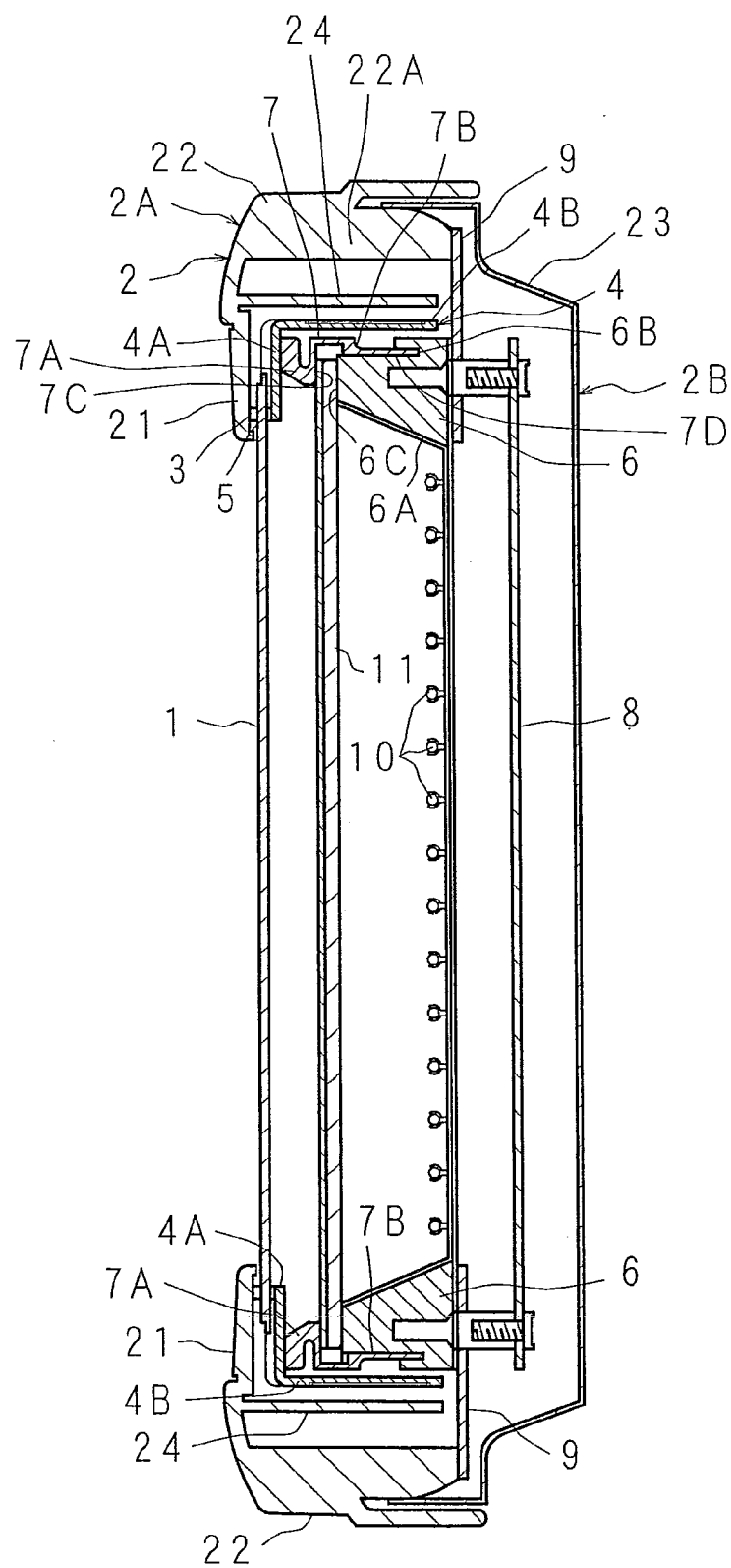
FIG. 1 is a side cross-sectional view illustrating a structure of a liquid crystal display device according to Embodiment 1 of the invention.

FIG. 1 is a side cross-sectional view illustrating a structure of a liquid crystal display device according to Embodiment 1 of the invention. The liquid crystal display device includes, in a space surrounded with a cabinet 2, a liquid crystal panel 1 (display panel) having a display face, backlights 10 irradiating the liquid crystal panel 1 from a rear face side and an optical sheet 11 for diffusion disposed between the liquid crystal panel 1 and the backlights 10.

The cabinet 2 is a plastic molded component and includes a front cabinet 2A including a frame part 21 having an opening 21c formed in its center so that an image on the liquid crystal panel 1 may be seen from the front and a peripheral part 22 connected to the outer periphery of the frame part 21 and extending in the backward direction so as to cover upper/lower and side peripheral faces; and a rear cabinet 2B including a rear part 23 having an outer periphery fixed on a rear edge portion of the peripheral part 22 of the front cabinet 2A and protruded so as to cover a rear face.

Behind the liquid crystal panel 1, a frame body 4 (holding member) including a front frame part 4A having an opening 4A1, which is rather larger than the opening of the frame part 21 of the front cabinet 2A so as to transmit light emitted from the backlights 10 to the liquid crystal panel 1 and is smaller than the outside dimension of the liquid crystal panel 1, and a peripheral frame part 4B connected to the outer periphery of the front frame part 4A and extending in the backward direction is disposed. The frame body 4 is a plastic molded component. A rim portion of the liquid crystal panel 1 is held by the frame part 21 of the front cabinet 2A with a cushioning material 3 sandwiched therebetween from the front side (i.e., the side of the display face) and the rim portion of the liquid crystal panel 1 is held by the front frame part 4A of the frame body 4 with a cushioning material 5 sandwiched therebetween from the rear side (i.e., the side opposite to the display face).

The backlights 10 are held inside a backlight chassis 6 made of a rectangular parallelepiped box having an opened front face and are composed of a plurality of linear fluorescent tubes transversely arranged. A reflecting film 6A is formed on the inner wall of the backlight chassis 6 and an engaging recess portion 6B for attaching it on a stepped frame 7 described later is provided on its outer periphery. The backlight chassis 6 has a front face portion 6C formed as a flat face on the outer peripheral side. A drive circuit board 8 for driving the backlights is provided at a distance behind the backlight chassis 6.

The stepped frame 7 is provided behind the front frame part 4A of the frame body 4 to be positioned inside the peripheral frame part 4B of the frame body 4. The stepped frame 7 includes a front side part 7A having a cross section bent inwardly in substantially a U-shape and a rear side part 7B connected to the outer periphery of the front side part 7A and extending in the backward direction. The front side part 7A has, in its front portion, a flat face in contact with the inner face of the front frame part 4A of the frame body 4, and has a step portion 7C in its rear portion. The rear side part 7B has an inner peripheral face in contact with the outer peripheral face of the backlight chassis 6, and a projection 7D to be fit in the engaging recess portion 6B of the backlight chassis 6 is formed in a rear edge portion of the rear side part 7B.

Figure 5A:
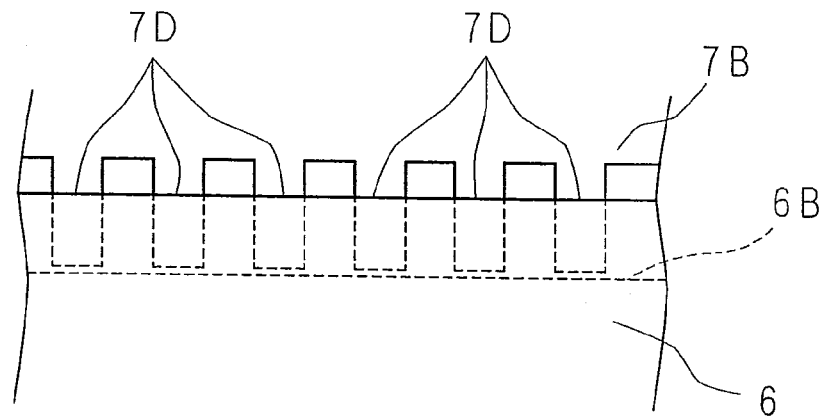
FIG. 5A is a plan view of a principal part of a modified structure of the liquid crystal display device of FIG. 1.
Figure 5B:
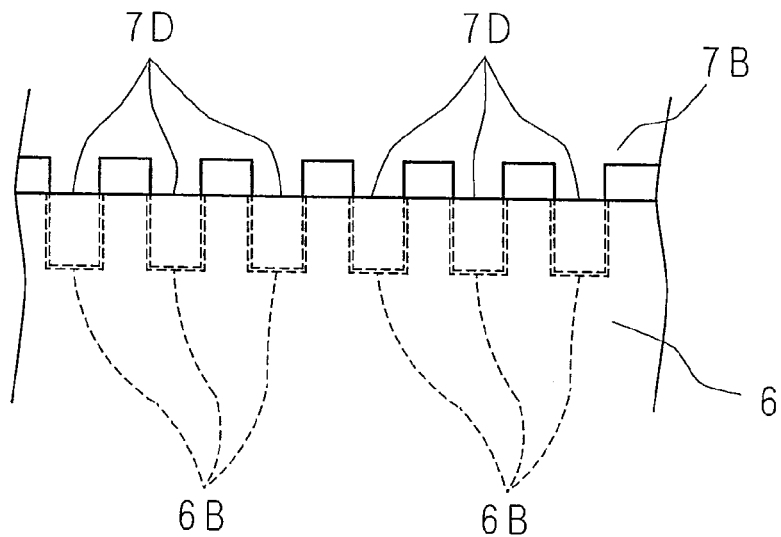
FIG. 5B is a plan view of a principal part of another modified structure of the liquid crystal display device of FIG. 1.

Incidentally, each of the engaging recess portion 6B and the projection 7D may be formed to extend continuously on the whole outer periphery of the backlight chassis 6 or on the whole periphery of the stepped frame 7, and may be modified as follows: FIGS. 5A and 5B are plan views illustrating principal parts of modified structures of the liquid crystal display device of FIG. 1, and as illustrated in FIG. 5A, the projection 7D may be formed as a plurality of projections 7D formed on the whole periphery to be spaced from each other with the engaging recess portion 6B continuously formed, or as illustrated in FIG. 5B, both the engaging recess portion 6B and the projection 7D may be formed as a plurality of engaging recess portions 6B and a plurality of projections 7D formed to be respectively aligned on the whole peripheries to be spaced from each other. In the case where both the engaging recess portion 6B and the projection 7D are continuously formed, they are engaged with each other on the whole periphery, and hence, a strong coupling force may be attained. In the case where the engaging recess portion 6B is continuously formed with the projection 7D dividedly formed, they can be easily coupled because the projections 7D are deformed in engaging. In the case where both the engaging recess portion 6B and the projection 7D are dividedly formed, the accuracy in alignment between the backlight chassis 6 and the stepped frame 7 may be improved.

With the step portion 7C of the stepped frame 7 brought into contact with the periphery of the optical sheet 11, the backlight chassis 6 is inserted so as to have its outer periphery in contact with the inner periphery of the rear side part 7B of the stepped frame 7, and thus, the front face portion 6C on the outer peripheral side of the backlight chassis 6 is brought into contact with the periphery of the optical sheet 11 from the rear side, so as to fit the projection 7D disposed on the rear side of the stepped frame 7 in the engaging recess portion 6B of the backlight chassis 6. It is noted that such an intermediate product obtained by coupling the optical sheet 11 and the backlight chassis 6 with the stepped frame 7 may be conveyed between factories or within a factory during the fabrication/assembly of the liquid crystal display device.

The peripheral part 22 of the front cabinet 2A includes a thick part 22A disposed inside a fixing portion with the rear face part 23 of the rear cabinet 2B, and a rear edge portion of the thick part 22A is formed in a flat face disposed substantially at the same position as the rear face of the backlight chassis 6. A holding frame 9 is provided so as to connect and hold the thick part 22A of the peripheral part 22 of the front cabinet 2A and the backlight chassis 6. The holding frame 9 is fixed onto a rear face portion of the backlight chassis 6 and a rear edge portion of the thick part 22A of the front cabinet 2A with screws. In this manner, the frame body 4 is supported by the peripheral part 22 of the front cabinet 2A and the liquid crystal panel 1 is held by the frame part 21 of the front cabinet 2A and the front frame part 4A of the frame body 4 from the front and rear sides.

Figure 2:
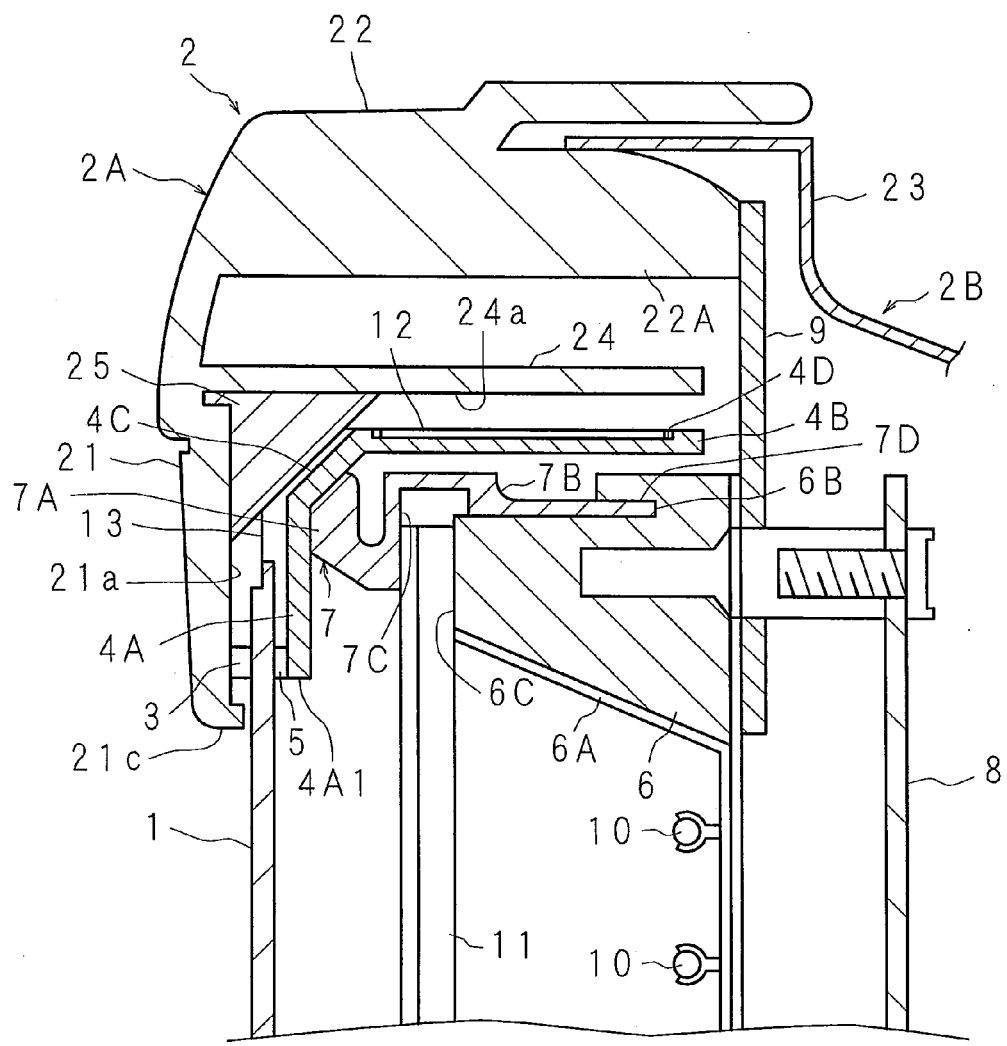
FIG. 2 is a side cross-sectional view of a principal part of the liquid crystal display device of FIG. 1.

FIG. 2 is a side cross-sectional view of a principal part of the liquid crystal display device of FIG. 1, and FIG. 3 is a perspective view thereof. On an inner wall 21a of the frame part 21 of the front cabinet 2A, an annular projection 24 (projecting portion) extending in the backward direction is formed on the whole periphery outside the position for holding the liquid crystal panel 1. The annular projection 24 is positioned outside the rim portion of the liquid crystal panel 1 and the frame body 4 and extends from the display face side of the liquid crystal panel 1 in the direction heading opposite to the display face. A peripheral face portion of the annular projection 24 extends in a direction substantially perpendicular to the inner face (the inner wall 21a) of the frame part 21.

A rib 25 (plate portion, reinforcing portion) is formed so as to connect the peripheral face portion 24a of the annular projection 24 and the inner wall 21a of the frame part 21 to each other. The rib 25 is a plate portion substantially perpendicular to the peripheral face portion of the annular projection 24 and the inner face of the frame part 21 and having a triangle shape in a side view, and is disposed inside the annular projection 24. A plurality of the ribs 25 are formed disposed at predetermined intervals, and a notch 4C is formed in a corner portion corresponding to a boundary between the frame part 4A and the peripheral frame part 4B of the frame body 4 correspondingly to each rib 25 so as to avoid interference with the rib 25.

On the upper face of the peripheral frame part 4B of the frame body 4, a receiving portion 4D for a circuit board 12 used for driving the liquid crystal panel 1 is provided. The receiving portion 4D is formed in the shape of a groove concaved from the surface of the peripheral frame part 4B. The circuit board 12 is connected to an electrode provided at an end of the liquid crystal panel 1 through a flexible cable 13. Although the receiving portion 4D is disposed in a position away from the corner corresponding to the boundary between the front frame part 4A and the peripheral frame part 4B for avoiding the notch 4C in FIGS. 2 and 3, the receiving portion 4D may be provided in a position shifted in the lengthwise direction of the upper face of the peripheral frame part 4B and in the vicinity of the corner corresponding to the boundary between the front frame part 4A and the peripheral frame part 4B for avoiding the notch 4C. It is noted that the receiving portion 4D for the circuit board 12 used for driving the liquid crystal panel 1 may be provided on a lower face of the peripheral frame part 4B of the frame body 4.

Figure 4:
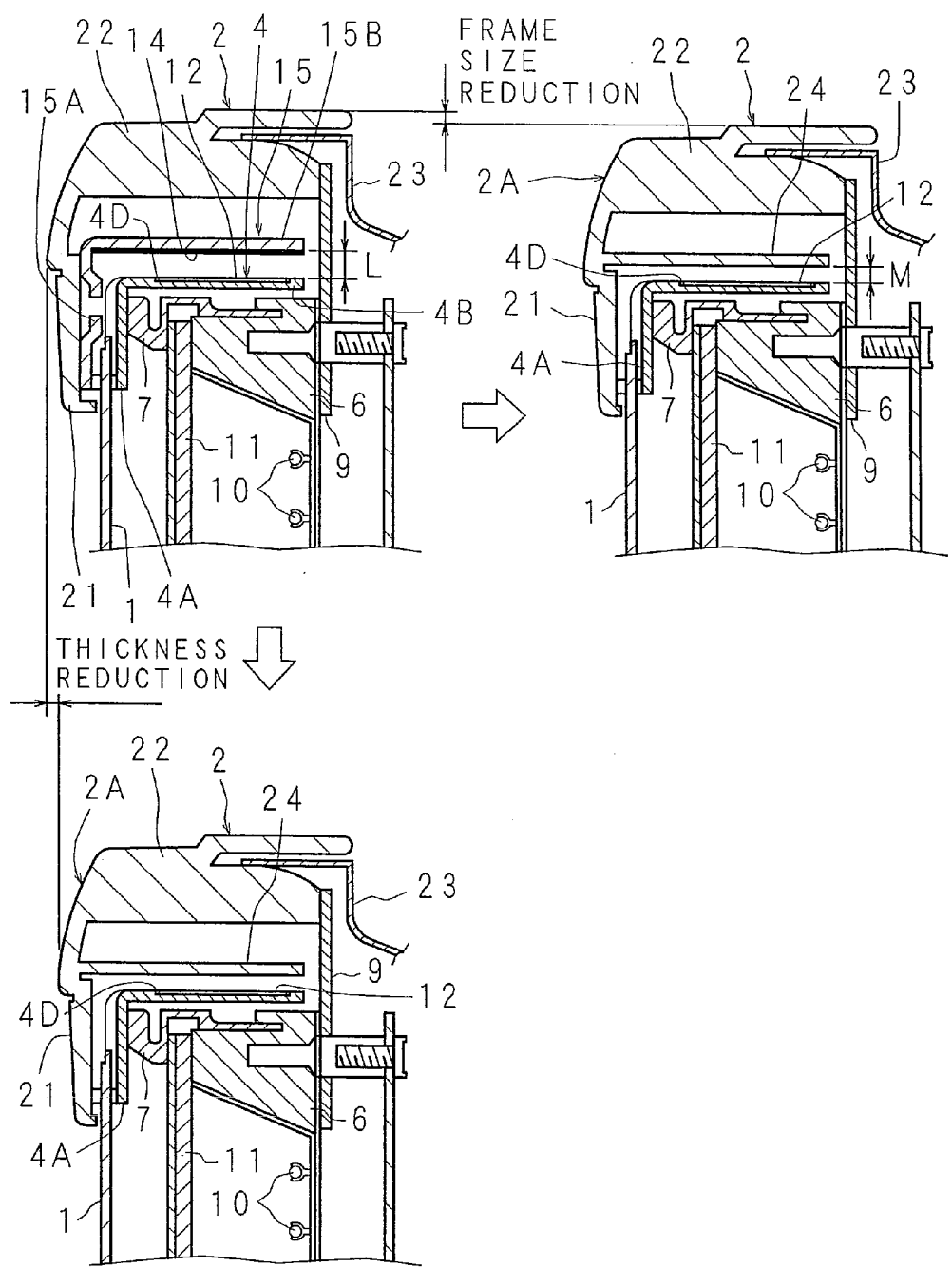
FIG. 4 is a side cross-sectional view illustrating comparison in the outside dimension between a conventional liquid crystal display device and the liquid crystal display device of FIG. 1.

The liquid crystal display device of this invention will be compared with a conventional liquid crystal display device using a bezel 15. FIG. 4 is a side cross-sectional view illustrating comparison in the outside dimension between the conventional liquid crystal display device and the liquid crystal display device of FIG. 1. Since the bezel 15 is not used in the present liquid crystal display device, the dimension in the depth direction is reduced to attain thickness reduction (as illustrated in a diagram disposed in a lower left portion), and since the peripheral part 22 of the cabinet 2 is disposed to be closer to the side of the frame body 4 instead of the peripheral frame part 15B of the bezel 15, the extension in the outward direction is reduced so as to attain frame size reduction (as illustrated in a diagram disposed in a upper right portion). Furthermore, when the bezel 15 is used, the peripheral frame part 15B made of a metal is close to the circuit board 12 held on the receiving portion 4D of the frame body 4, and therefore it is necessary to protect the circuit board 12 by covering the inner wall of the peripheral frame part 15B opposing the circuit board 12 with an insulating sheet 14. In the liquid crystal display device of this invention, however, although the annular projection 24 of the front cabinet 2A is close to the circuit board 12 held by the receiving portion 4D of the frame body 4, since the front cabinet 2A has an insulating property, there is no need to cover it with an insulating tape.

Embodiment 2

Figure 6:
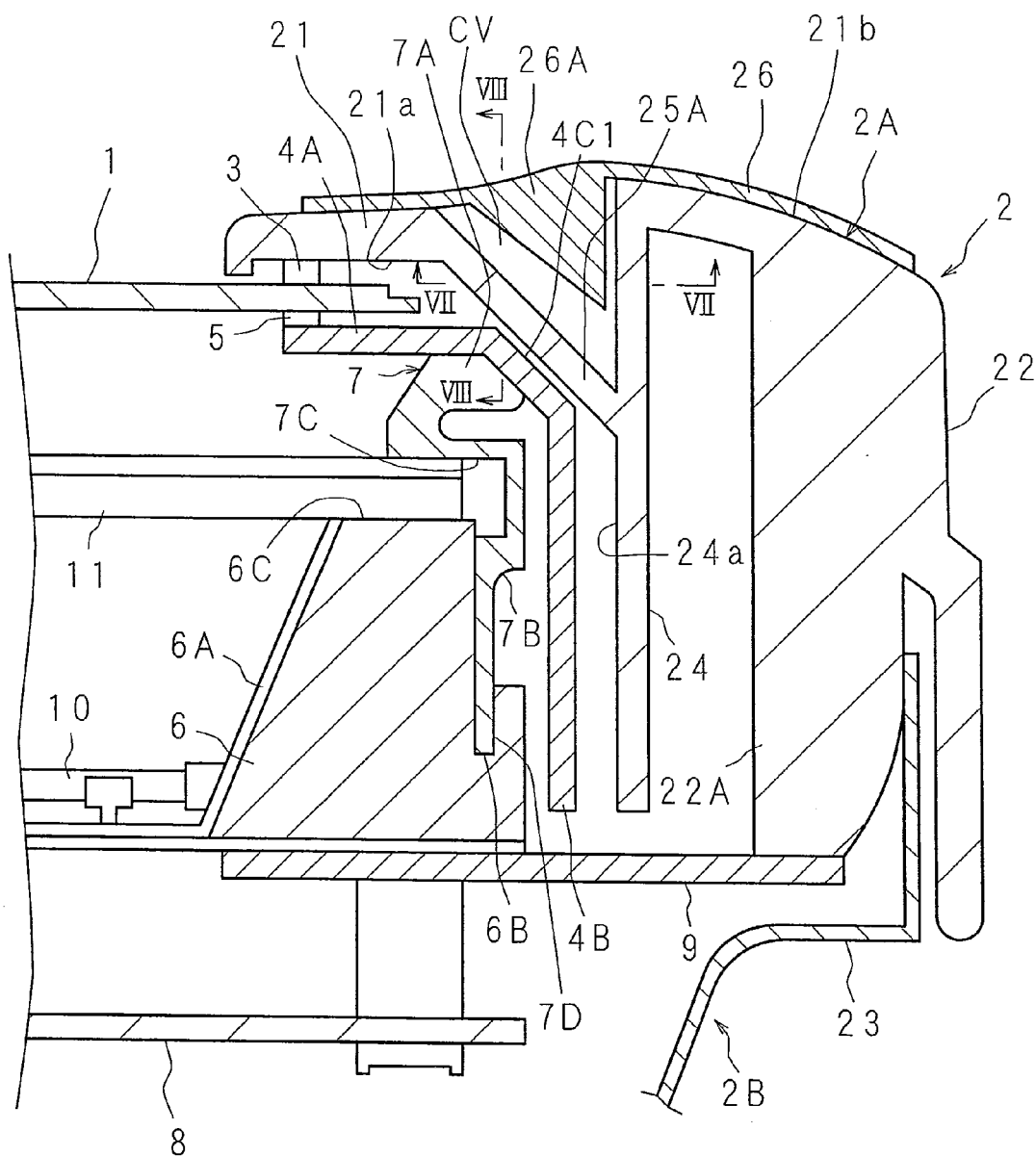
FIG. 6 is a plane cross-sectional view illustrating a structure of a liquid crystal display device according to Embodiment 2 of the invention.
Figure 7:
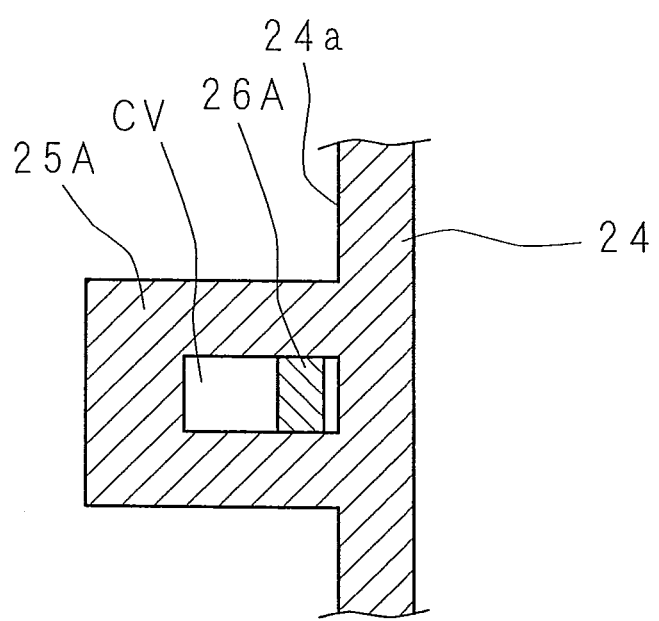
FIG. 7 is a cross-sectional view taken on line VII-VII of FIG. 6.
Figure 8:
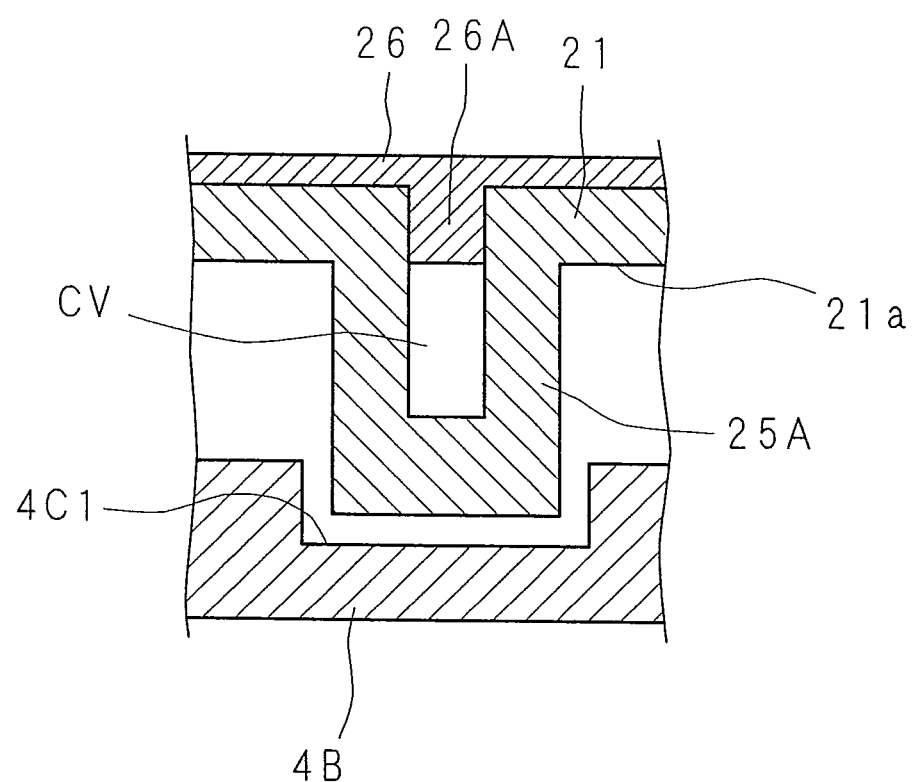
FIG. 8 is a cross-sectional view taken on line VIII-VIII of FIG. 6.
Figure 9:
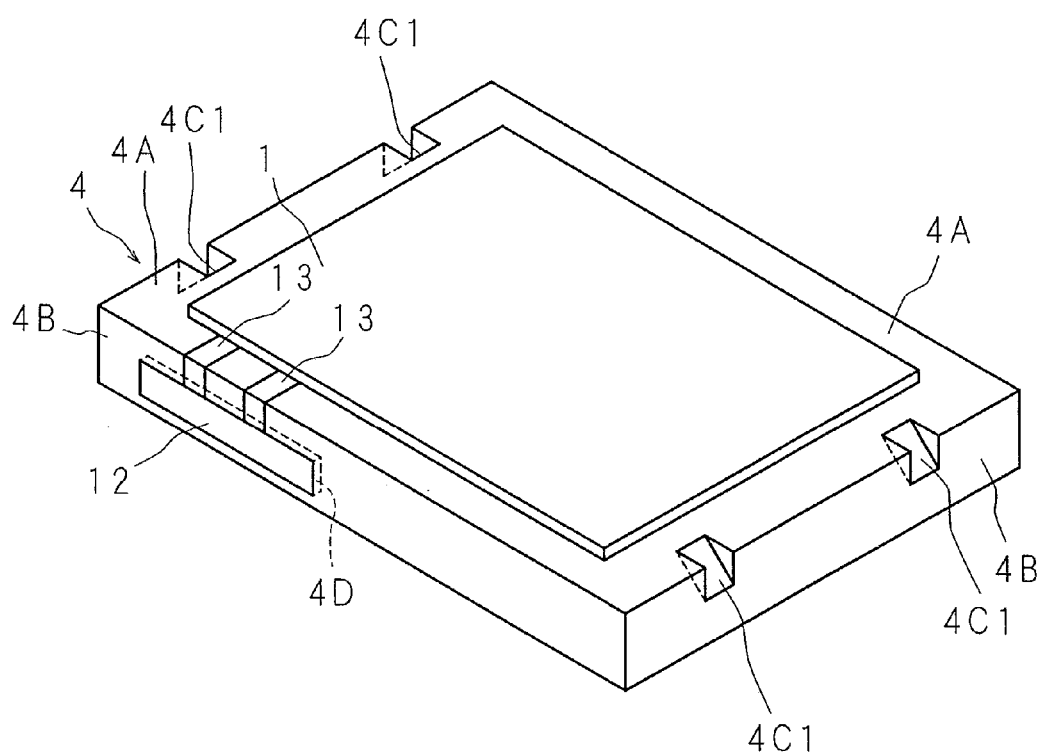
FIG. 9 is a perspective view of a principal part of the liquid crystal display device of FIG. 6.

FIG. 6 is a plane cross-sectional view illustrating a structure of a liquid crystal display device according to Embodiment 2 of the invention, FIG. 7 is a cross-sectional view taken on line VII-VII of FIG. 6, FIG. 8 is a cross-sectional view taken on line VIII-VIII of FIG. 6, and FIG. 9 is a perspective view of a principal part of the liquid crystal display device of FIG. 6.

In Embodiment 2 of the invention, a rib 25A (plate portion, reinforcing portion) having a larger thickness than the aforementioned rib 25 is provided and the rib 25A has a cavity CV inside, which corresponds to a difference from Embodiment 1. Four ribs 25A are provided in total correspondingly to upper and lower positions on right and left sides of a front frame part 4A of a frame body 4. At a corner corresponding to a boundary between the front frame part 4A and a peripheral frame part 4B of the frame body 4, a notch 4C1 is formed so as to avoid interference with each rib 25A in the same manner as in Embodiment 1.

The cavity CV is in the shape of a flat triangular column according to the external shape of the rib 25A and is surrounded with inner faces respectively parallel to plate faces on both sides of the triangle shape of the rib 25A. The cavity CV is opened on a side, out of the three sides of the triangle shape of the rib 25A, disposed on the front face side of a frame part 21. Furthermore, in Embodiment 2, a sheet-like cover 26 is attached on an outer wall 2 lb of the frame part 21 so as to cover the openings of the respective cavities CV. The cover 26 has, on its inner face, four convex portions 26A to be fit in the respective cavities CV. The cover 26 is adhered onto the outer wall 21b of the frame part 21 with a double-sided adhesive tape after fitting the convex portions 26A in the respective cavities CV.

Although not shown in the drawings, each cavity CV provided inside the rib 25A may be surrounded with inner faces in any of various shapes not parallel to the plate faces of the triangle shape of the rib 25A.

Embodiment 3

Figure 10:
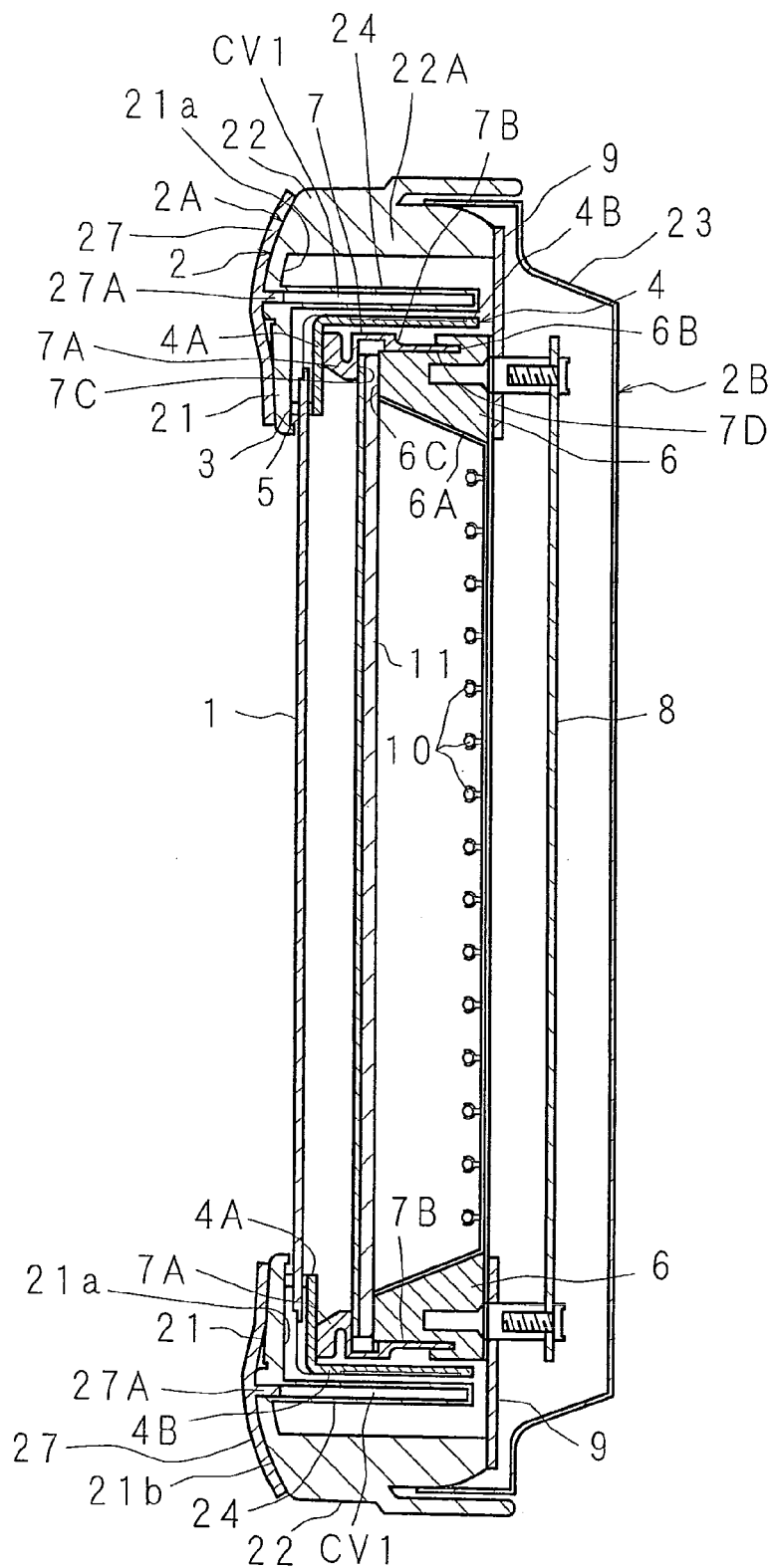
FIG. 10 is a side cross-sectional view illustrating a structure of a liquid crystal display device according to Embodiment 3 of the invention.
Figure 11:
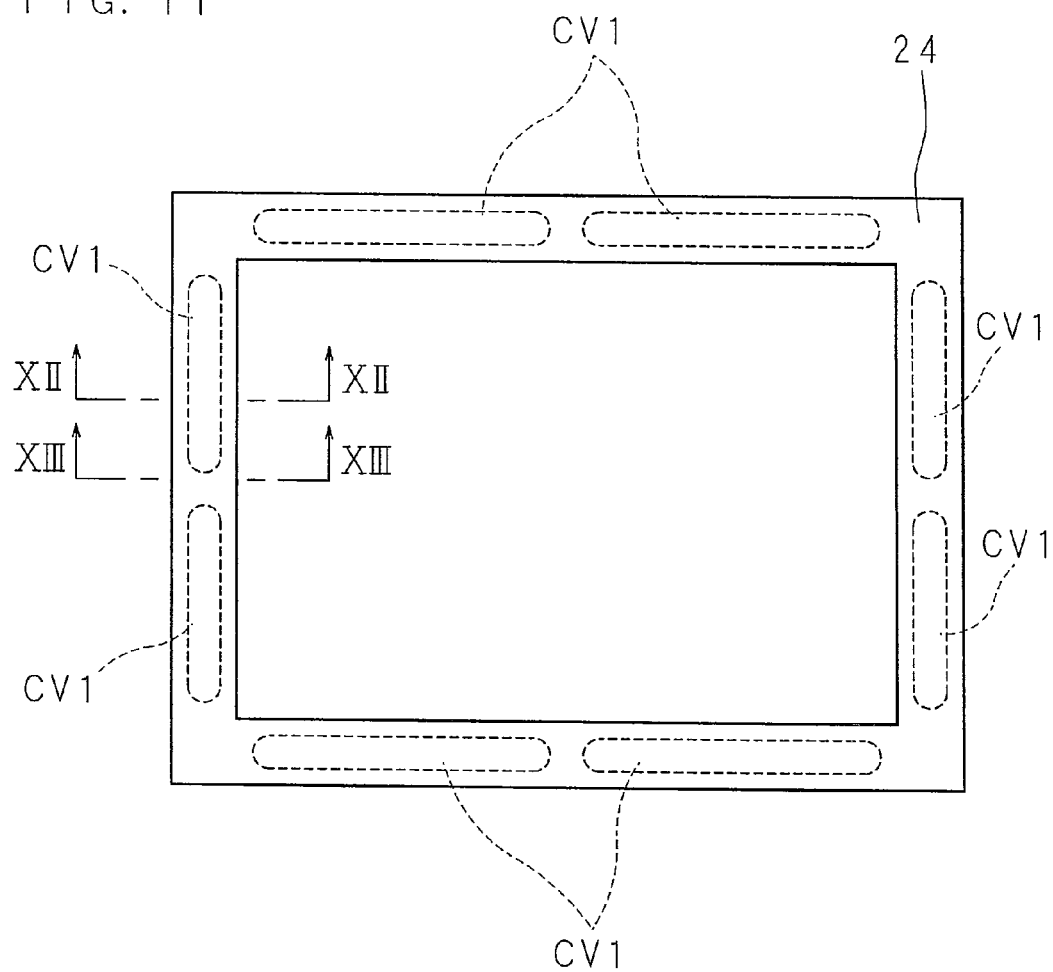
FIG. 11 is a rear view of a partial structure of the liquid crystal display device of FIG. 10.
Figure 12:
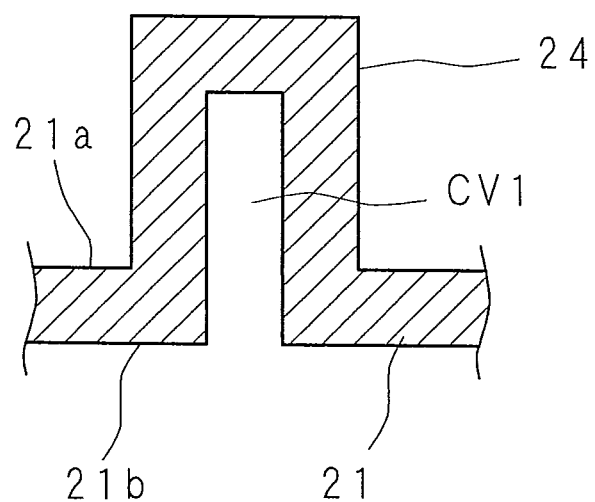
FIG. 12 is a cross-sectional view taken on line XII-XII of FIG. 11.

FIG. 10 is a side cross-sectional view illustrating a structure of a liquid crystal display device according to Embodiment 3 of the invention, FIG. 11 is a rear view illustrating a partial structure of the liquid crystal display device of FIG. 10, FIG. 12 is a cross-sectional view taken on line XII-XII of FIG. 11, and FIG. 13 is a cross-sectional view taken on line XIII-XIII of FIG. 11.

Although the rib 25 is formed between the inner wall 21a of the frame part 21 of the cabinet 2 and the annular projection 24 in Embodiments 1 and 2, the rib 25 may be omitted depending upon the degree of the rigidity of the frame part 21 itself of the cabinet 2. In Embodiment 3 of the invention, the width of an annular projection 24 is increased for attaining higher rigidity so as to omit a rib 25 and the annular projection 24 has a cavity CV1 inside, which corresponds to a difference from Embodiments 1 and 2.

The annular projection 24 is in the shape of a rectangular frame, cavities CV1 are formed within frame portions of upper and lower sides and right and left sides of the annular projection 24 is surrounded with inner faces respectively parallel to surfaces of the frame portions, and two elongated cavities CV1 are formed to be spaced from each other in the lengthwise direction of each frame portion. Each cavity CV1 is opened on the side of an outer wall 21b of a frame part 21, and since there remains a frame portion not having a cavity between the adjacent cavities CV1 (as illustrated in FIG. 13), the rigidity of the annular projection 24 may be secured. It is noted that the size, the position, the number and the like of the cavities CV1 may be appropriately modified.

Also in Embodiment 3 of the invention, a sheet-like cover 27 for covering the openings of the respective cavities CV1 is attached on the outer wall 21b of the frame part 21 in the same manner as in Embodiment 2. The cover 27 has, on its inner face, elongated convex portions 27A to be fit in the respective cavities CV1. The cover 27 is adhered onto the outer wall 21b of the frame part 21 with a double-sided adhesive tape after fitting the convex portions 27A in the respective cavities CV1.

Embodiment 4

Figure 14:
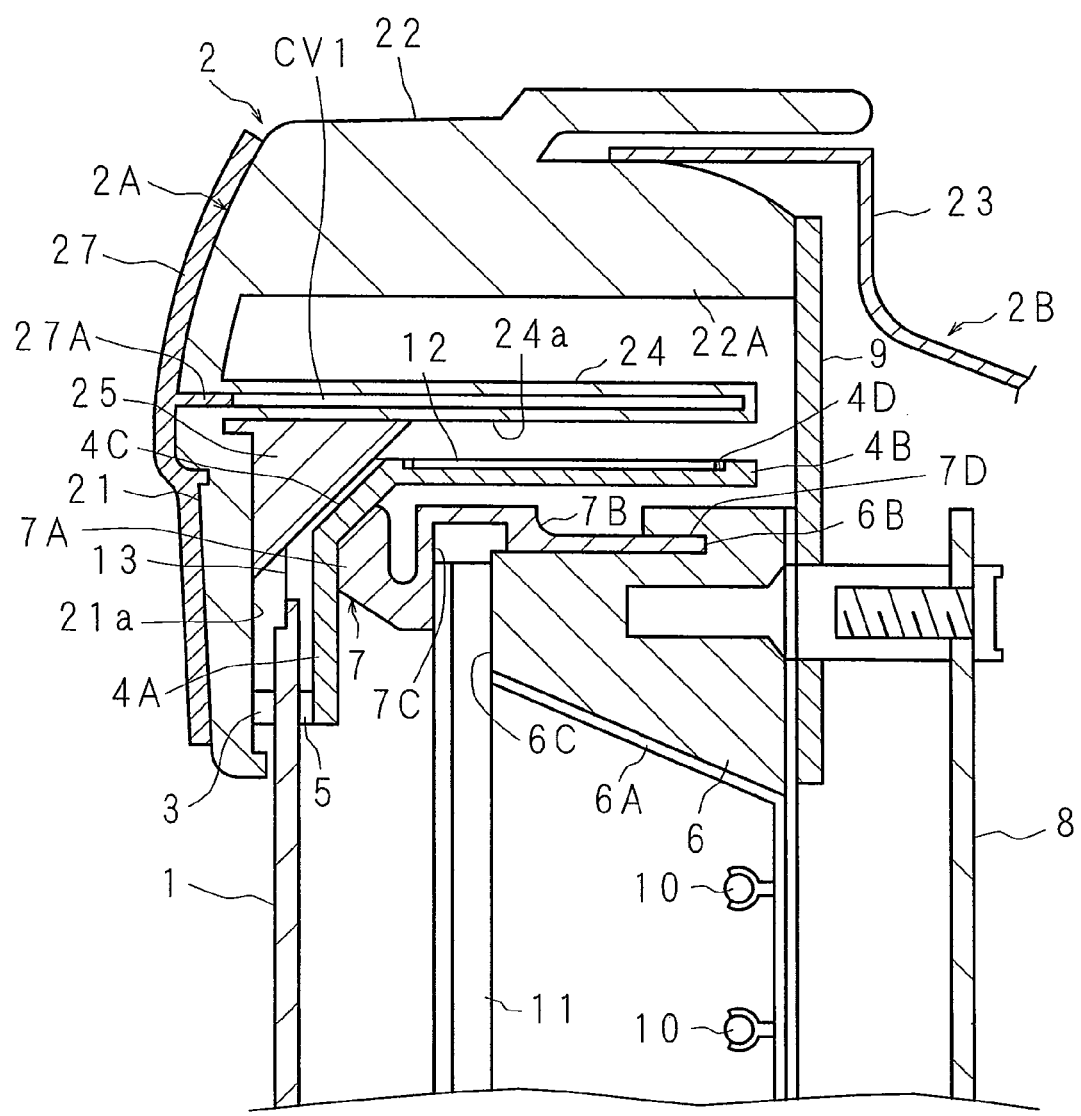
FIG. 14 is a side cross-sectional view illustrating a principal part of a liquid crystal display device according to Embodiment 4 of the invention.

FIG. 14 is a side cross-sectional view illustrating a principal part of a liquid crystal display device according to Embodiment 4 of the invention.

The above mentioned liquid crystal display device according to Embodiment 3 comprises a structure in which the annular protrusion 24 has the cavity CV1 inside and the width of the annular projection 24 is increased for attaining higher rigidity so as to omit a rib 25. In Embodiment 4, a rib is further provided in addition to the annular projection 24 having the cavity CV1 inside, which corresponds to a difference from Embodiment 3.

FIG. 14 shows the same rib as the rib 25 according to Embodiment 1, but the rib 25A having the cavity CV inside according to Embodiment 2 may be provided instead of rib 25.

The liquid display device according to Embodiment 4 allows the securement of further rigidity of the frame part as compared to the liquid display device according to Embodiment 3.

Embodiment 5

Figure 15:
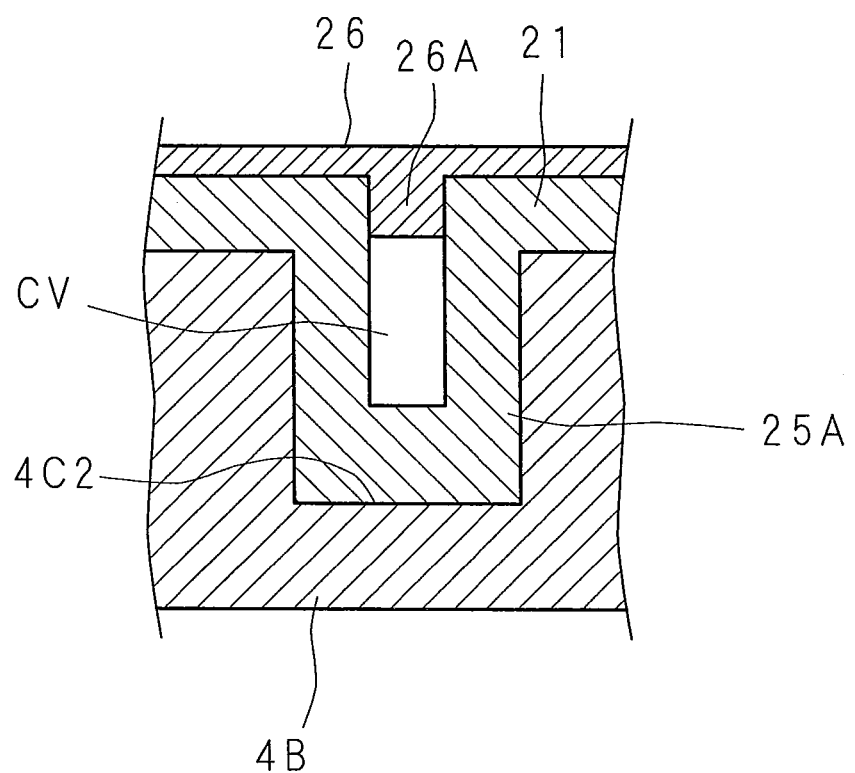
FIG. 15 is a cross-sectional view of a principal part of a liquid crystal display device according to Embodiment 5of the invention.

FIG. 15 is a cross-sectional view of a principal part of a liquid crystal display device according to Embodiment 5 of the invention and is a diagram corresponding to FIG. 8 of Embodiment 2.

Differently from Embodiments 1 and 2 where the notches 4C and 4C1 do not interfere the ribs 25 and 25A, a rib 25A is fit in a notch 4C2 (recess portion) in Embodiment 5. Specifically, the dimension of the notch 4C2 is slightly larger than the outside dimension of the rib 25A.

Figure 16:
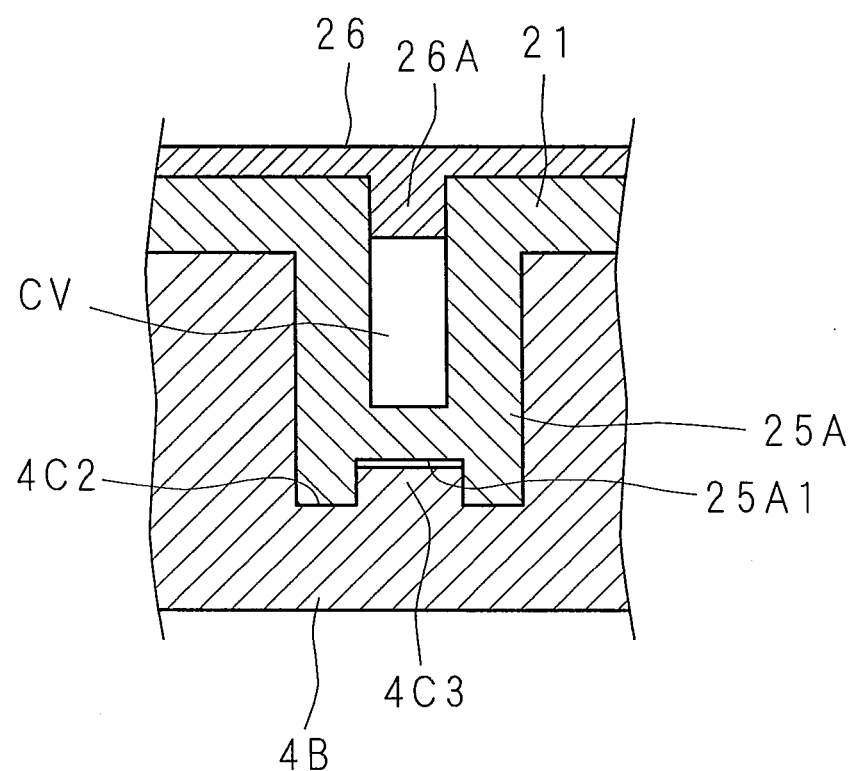
FIG. 16 is a cross-sectional view illustrating a principal part of a modified structure of a liquid crystal display device according to Embodiment 5 of the invention.

FIG. 16 is a cross-sectional view illustrating a principal part of a modified structure of a liquid crystal display device according to Embodiment 5 of the invention, and is a diagram corresponding to FIG. 8 of Embodiment 2. The rib 25A (a reinforcing portion) may be provided with a recess portion 25A1 which is recessed and has an internal peripheral face in a direction substantially perpendicular to the inner face of a frame part 21 and a convex portion 4C3 to be fit in the recess portion 25A1 is provided in the notch 4C2 in an outer peripheral portion of a peripheral frame part 4B.

Figure 17:
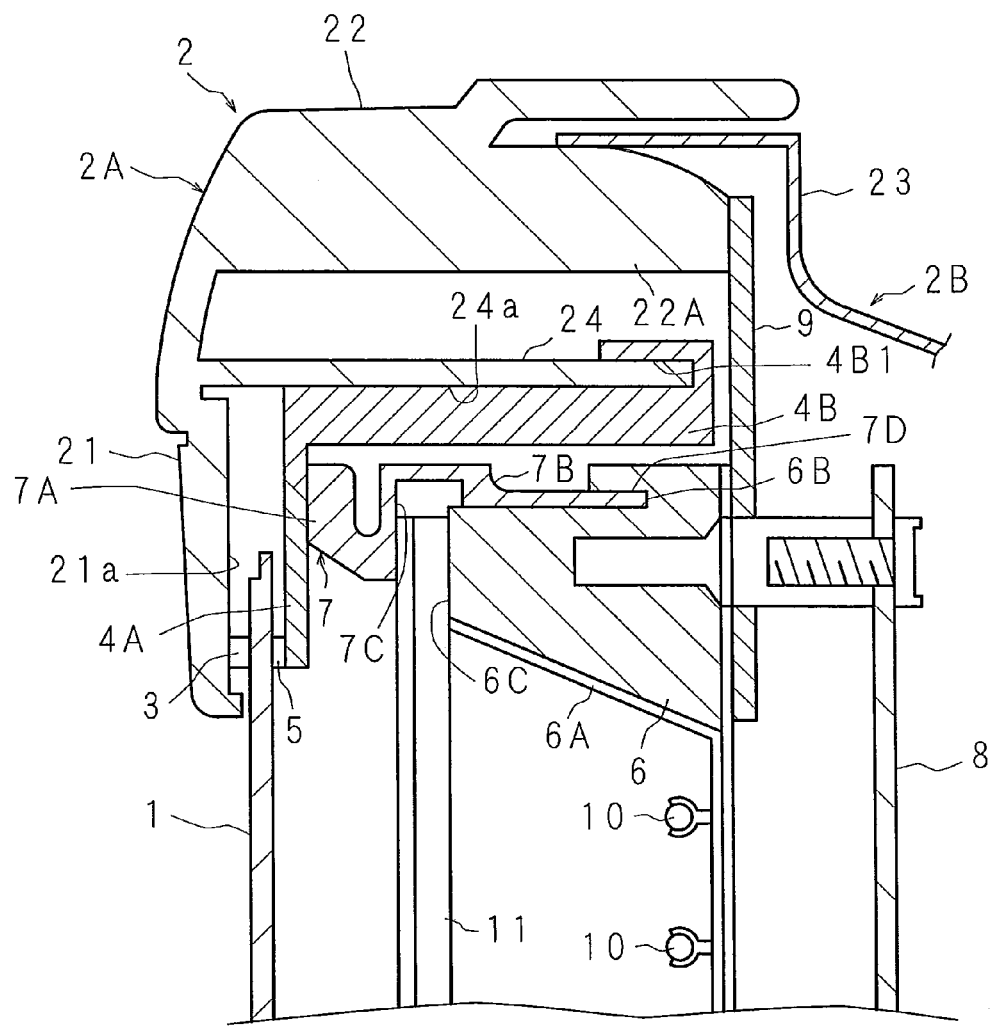
FIG. 17 is a side cross-sectional view illustrating a modified structure of a liquid crystal display device of the present invention.

Although the peripheral frame part 4B of the frame body 4 is spaced from the inner peripheral part 24a of the annular projection 24 in each of Embodiments 1 through 5 described above, the peripheral frame part 4B may be engaged with the annular projection 24 so as to increase the rigidity. FIG. 17 is a side cross-sectional view illustrating a modified structure of the liquid crystal display device of the invention. The peripheral frame part 4B has a larger thickness so as to be in contact with the inner peripheral portion 24a of the annular projection 24, and an engaging recess portion 4B1 is provided in a rear edge portion of the peripheral frame part 4B so as to engage a rear edge portion of the annular projection 24 with the engaging recess portion 4B1.

Although the frame body 4 holding the liquid crystal panel 1 from the side opposite to the display face is supported by the peripheral part 22 of the front cabinet 2A in each of Embodiments 1 through 5 described above, the frame body 4 may be supported by the rear part 23 or by both the peripheral part 22 and the rear part 23.

The holding member for supporting the rear face portion of the liquid crystal panel 1 from the rear side is the frame body 4 having the peripheral frame part 4B equipped with the receiving portion 4D for the drive circuit board 12 for driving the liquid crystal panel 1 in each of Embodiments 1 through 5 described above, which does not limit the invention. For example, the holding member may be a frame body including the front frame part 4A alone. When the peripheral frame part 4B is omitted, the dimension in the depth direction of the frame body 4 is reduced, and hence, further thickness reduction may be attained by also reducing the dimensions in the depth direction of the backlight chassis 6 and the stepped frame 7.

Figure 18:
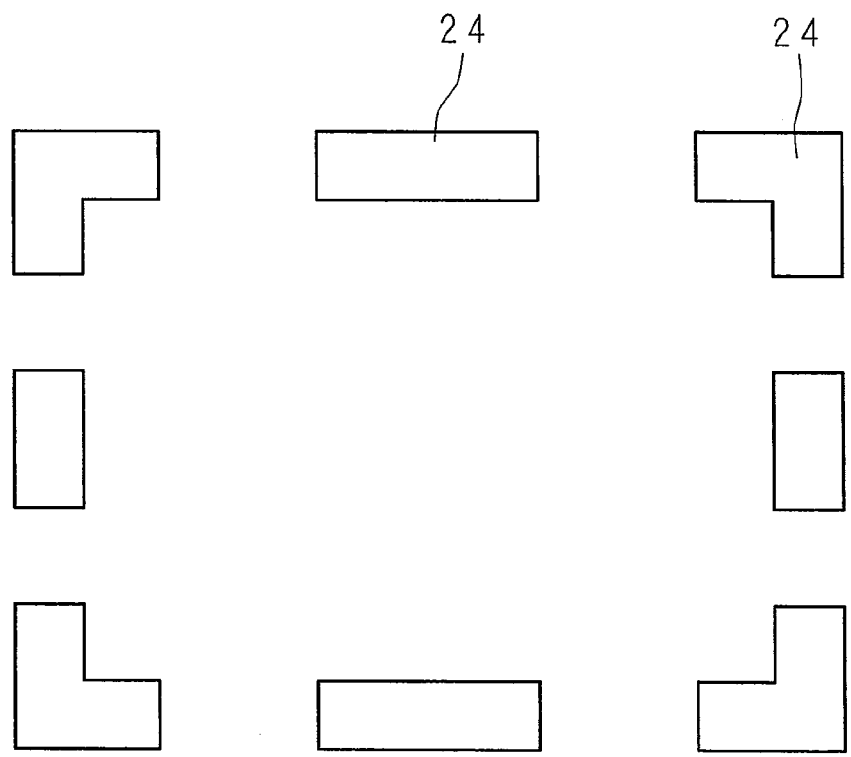
FIG. 18 is a side cross-sectional view illustrating a modified structure of a liquid crystal display device of the invention.

Although the annular projection 24 extending in the backward direction is formed on the inner wall 21a on the outer peripheral side of the frame part 21 of the cabinet 2 in each of Embodiments 1 through 5 described above, a plurality of projections arranged in the shape of a ring at intervals in the circumferential direction may be provided instead of the annular projection 24. FIG. 18 is a side cross-sectional view illustrating a modified structure of a liquid crystal display device of the invention. FIG. 18 shows a structure in which a plurality of the projections 24 are provided at positions corresponding to corners of the frame part 21 and middle portions between the corners. However, the arrangement, the shape, the number and the like of the projections may be set in accordance with a position for increasing the rigidity in the frame part 21.

Embodiment 6

Figure 19:
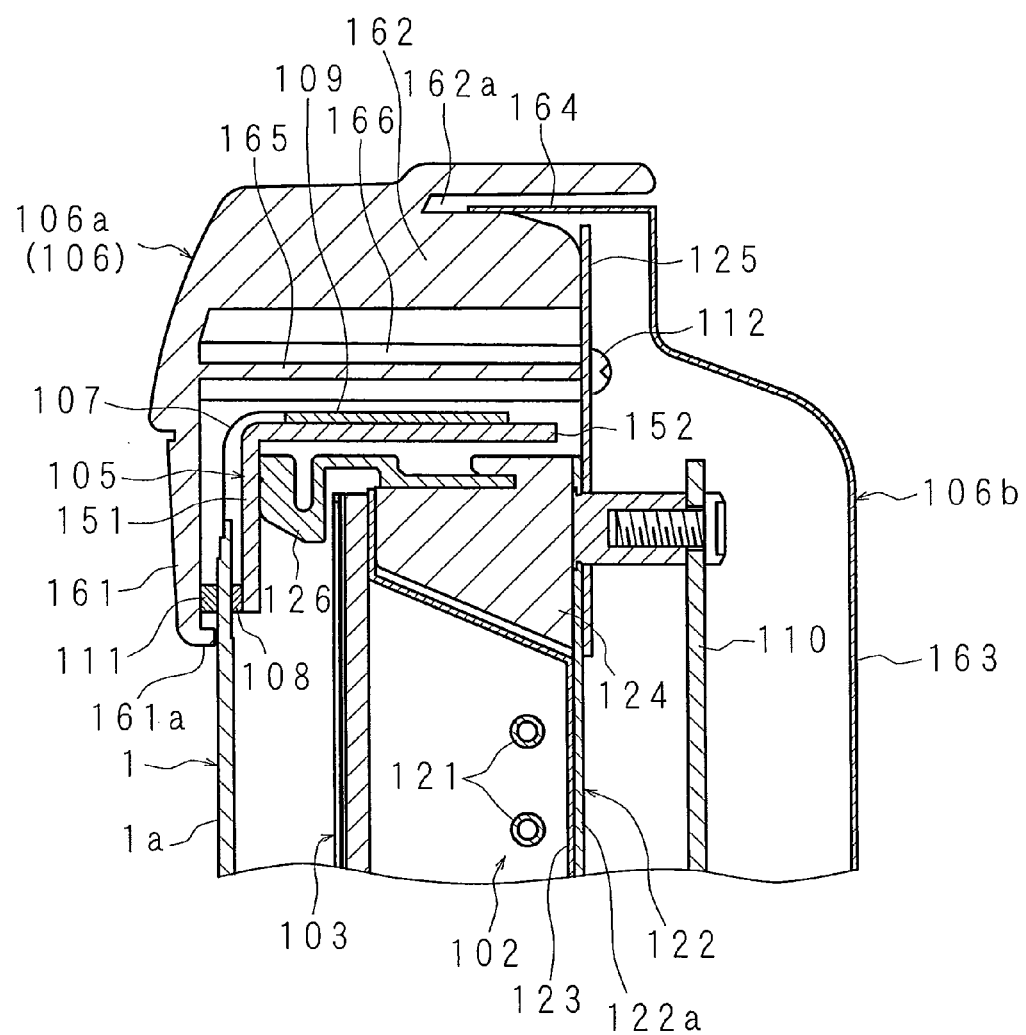
FIG. 19 is a partly omitted vertical side cross-sectional view illustrating a structure of a liquid crystal display device according to Embodiment 6 of the invention.
Figure 20:
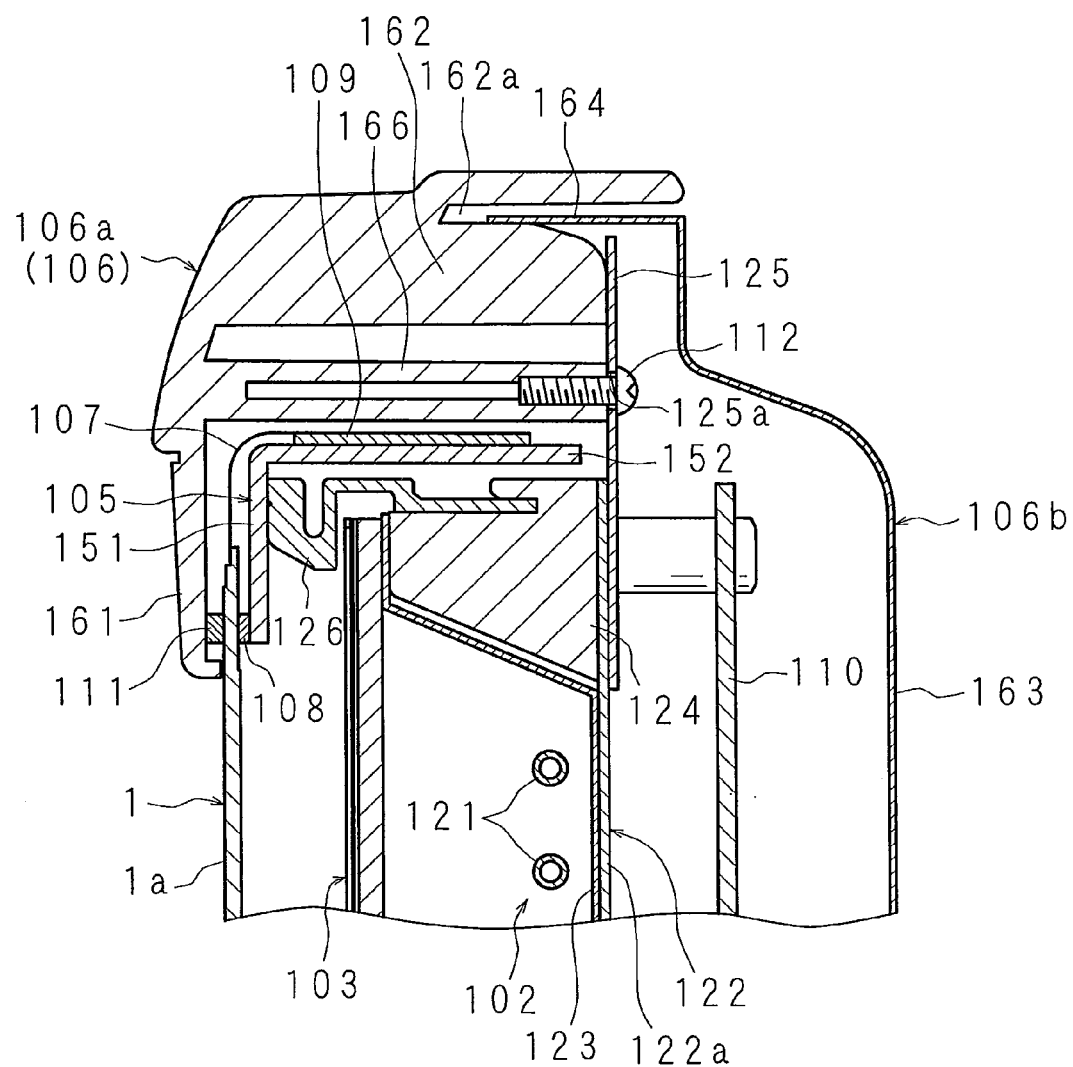
FIG. 20 is a vertical side cross-sectional view of the liquid crystal display device of Embodiment 6 of the invention taken on another cross section.

FIG. 19 is a partly omitted vertical cross-sectional view illustrating a structure of a liquid crystal display device according to Embodiment 6 of the invention and FIG. 20 is a vertical cross-sectional view thereof taken on another cross section.

This liquid crystal display device is a liquid crystal television, that is, a liquid crystal display device, including a liquid crystal panel 1 (display panel) having, on its front side, a display face 1a for displaying television images; a light source part 102 disposed behind the liquid crystal panel 1; an optical sheet 103 disposed between the light source part 102 and the liquid crystal panel 1; a holding frame body 105 disposed between the optical sheet 103 and the liquid crystal panel 1 for holding a rear side of a rim portion of the liquid crystal panel 1; a cabinet 106 including a frame portion 161 (frame part) disposed in front of the rim portion of the liquid crystal panel 1 and covering the periphery of the liquid crystal panel 1 and a rear side of the light source part 102; and a stand provided on a rear face of the light source part 102.

The liquid crystal panel 1 is in a substantially rectangular parallelepiped shape, and ends on one side of a plurality of flexible printed boards 107 having electronic components thereon are connected to front face portions in upper and lower edge portions of the liquid crystal panel 1.

The holding frame body 105 disposed behind the liquid crystal panel 1 includes a rectangular annular plate portion 151 opposing the rear face of the rim portion of the liquid crystal panel 1 and a frame portion 152 extending in the backward direction from the outer edge of the annular plate portion 151, and the holding frame body 105 and a casing 122 described below together form a holding member. It is noted that the holding frame body 105, the annular plate portion 151 and the frame portion 152 respectively correspond to the frame body 4, the front frame part 4A and the peripheral frame part 4B of Embodiments 1 through 5.

A belt-shaped elastic body 108 for elastically receiving the rim portion of the liquid crystal panel 1 is adhered on the front face of the annular plate portion 151, and printed circuit boards 109 connected to ends on the other side of the flexible printed boards 107 are attached on outer faces of an upper wall and a lower wall of the frame portion 152. Furthermore, engaging clicks protruding in the backward direction are integrally formed in a plurality of positions in the circumferential direction of the frame portion 152. Each engaging click includes a click provided at the tip of a flexible leg portion.

The light source part 102 includes a plurality of cylindrical lamps 121 arranged to be vertically spaced from each other; a casing 122 in the shape of a dish for supportively containing the lamps 121 and supporting the periphery of the optical sheet 103; and a reflecting sheet 123 provided on the inner face of a rear wall of the casing 122 for reflecting light emitted from the lamps 121 contained in the casing 122 toward an opening side of the casing 122, and an electric component 110 such as a circuit board or the like is attached onto the outer face of the rear wall of the casing 122.

Each lamp 121 is a cold-cathode tube or a hot-cathode tube having electrodes at both ends, its both ends are held by recess holders provided on right and left sides in the casing 122 and its center portion is held on the rear wall of the casing 122 with a lamp clip.

The casing 122 is in a substantially rectangular parallelepiped shape and includes the rear wall 122a in a substantially rectangular shape; a lamp holder fixed on right and left portions on the front face of the rear wall 122a for holding the both ends of the lamps 121 and receiving the periphery of the optical sheet 103; and a receiving member 124 fixed on upper and lower portions on the front face of the rear wall 122a for receiving the periphery of the optical sheet 103, and the casing 122 further includes an attaching plate 125 fixed on a peripheral portion on the rear face of the rear wall 122a. The receiving member 124 supports a restraining member 126 for restraining movement of the optical sheet 103.

The attaching plate 125 is provided with a plurality of insertion holes 125a (coupled portion) respectively corresponding to holes of cylindrical bosses 166 described later and engaging holes corresponding to the engaging clicks of the frame portion 152, and the engaging clicks are engaged with edges of the engaging holes so as to couple the holding frame body 105 with the casing 122.

The cabinet 106 includes a cabinet front part 106a composed of the frame portion 161 disposed in front of the rim portion of the liquid crystal panel 1 for covering the annular plate portion 151 of the holding frame body 105 and a rectangular tubular portion 162 (peripheral part) extending in the backward direction from the outer edge of the frame portion 161 and larger than the holding frame body 105; and a cabinet rear part 106b composed of a dish plate portion 163 (rear part) covering the rear side of the casing 122 and a rectangular tubular portion 164 extending in the forward direction from the outer edge of the dish plate portion 163 and larger than the holding frame body 105.

Figure 21A:
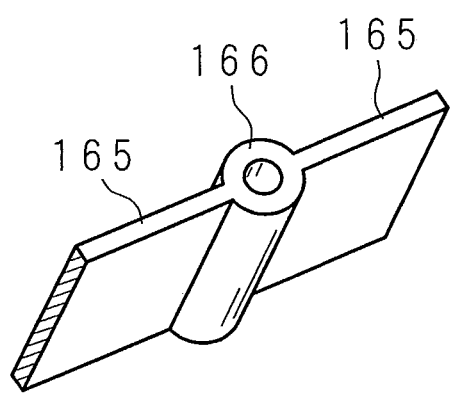
FIG. 21A is a perspective view illustrating a structure of a rib and a cylindrical boss of the liquid crystal display device of Embodiment 6 of the invention.
Figure 21B:
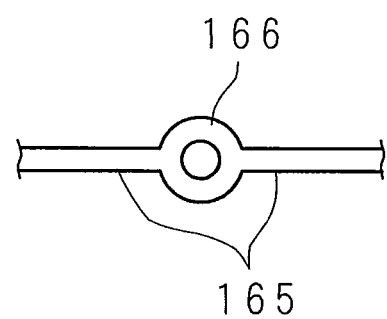
FIG. 21B is a cross-sectional view illustrating the structure of the rib and the cylindrical boss of the liquid crystal display device of Embodiment 6 of the invention.

FIG. 21A is a perspective view illustrating a structure of a rib and a cylindrical boss used in the liquid crystal display device of Embodiment 6 of the invention, and FIG. 21B is a cross-sectional view illustrating the structure of the rib and the cylindrical boss.

The frame portion 161 of the cabinet front part 106a has an opening 161a, and is formed to have a larger size than the liquid crystal panel 1, and in a position outside the frame portion 161 and opposing the periphery of the casing 122, an annular rib 165 (projecting portion) extending in the backward direction for substantially blocking a peripheral space between the frame portion 161 and the casing 122 for attaining a dust-proof effect and cylindrical bosses 166 provided in a plurality of positions in the circumferential direction of the rib 165 are integrally formed by using a synthetic resin material, and furthermore, a belt-shaped elastic body 111 for elastically holding the rim portion of the liquid crystal panel 1 is adhered in a position inside the frame portion 161 and opposing the front face of the liquid crystal panel 1. Moreover, a surrounding groove 162a and a screw hole disposed inside the surrounding groove 162a are provided in a rear edge portion of the rectangular tubular portion 162, and the rectangular tubular portion 164 is inserted into the surrounding groove 162a for attaining a dust-proof effect. It is noted that the cylindrical bosses 166 correspond to a coupling portion.

The rib 165 has a cross section in a plate shape and has a length substantially equal to a distance between the frame portion 161 and the attaching plate 125, and when the frame portion 161 is coupled with the casing 122, the end of the rib 165 is in contact with or opposes to have a slight gap from the periphery of the casing 122, so as to substantially block the peripheral space between the frame portion 161 and the casing 122.

Each cylindrical boss 166 is connected to the frame portion 161 at its base end and is formed integrally with the rib 165 over the end of the rib 165 as illustrated in FIGS. 21A and 21B, so that a male screw 112 of a tapping screw may be screwed into the hole of the cylindrical boss 166.

A plurality of insertion holes spaced from each other in the circumferential direction are formed correspondingly to the screw holes in an outer edge portion of the dish plate portion 163 of the cabinet rear part 106b, and the cabinet rear part 106b is coupled with the cabinet front part 106a with male screws inserted into the insertion holes and screwed into the screw holes. It is noted that a plurality of radiating holes are formed in the dish plate portion 163.

The liquid crystal display device having the aforementioned structure is assembled through, for example, the following steps (1) through (6):

(1) The reflecting sheet 123 and the lamps 121 are assembled in the casing 122 horizontally placed on a worktable with its opening facing upward, so as to form the light source part 102. The optical sheet 103 is placed above the light source part 102, and the periphery of the optical sheet 103 is supported by the lamp holder and the receiving member 124.

(2) The holding frame body 105 is placed above the optical sheet 103, the engaging clicks of the holding frame body 105 are fit in and engaged with the engaging holes of the casing 122, so as to couple the holding frame body 105 and the casing 122 with each other.

(3) The liquid crystal panel 1 is inserted into the cabinet front part 106a horizontally placed on a worktable with the frame portion 161 positioned on a lower side, so as to be placed on the frame portion 161.

(4) The holding frame body 105 and the casing 122 coupled with each other are turned round so as to have the holding frame body 105 positioned on a lower side and are placed above the liquid crystal panel 1 while keeping this turned state. At this point, the rim portion of the liquid crystal panel 1 is sandwiched between the frame portion 161 and the annular plate portion 151, and the ends of the rib 165 and the cylindrical bosses 166 are in contact with the attaching plate 125, so as to substantially block the peripheral space between the frame portion 161 and the casing 122 disposed on the peripheral side of the liquid crystal panel 1.

(5) The male screws 112 are inserted into the insertion holes 125a of the attaching plate 125 in the casing 122 and the male screws 112 are screwed into the holes of the cylindrical bosses 166, so as to couple the cabinet front part 106a and the casing 122 with each other.

(6) The male screws are inserted into the insertion holes of the cabinet rear part 106b and the male screws are screwed into the screw holes of the rectangular tubular portion 162, so as to couple the cabinet front part 106a and the cabinet rear part 106b with each other When the rim portion of the liquid crystal panel 1 is sandwiched between the frame portion 161 and the annular plate portion 151 of the holding frame body 105 in this manner, the rib 165 is in contact with the periphery of the casing 122 so as to substantially block, for the dust-proof effect, the peripheral space between the frame portion 161 and the casing 122 on the peripheral side of the liquid crystal panel 1, and hence, dust having entered the cabinet 106 through the plural radiating holes formed on the cabinet rear part 106b can be prevented from proceeding through a space around the holding frame body 105 toward the liquid crystal panel 1, so as to prevent the dust from adhering onto the rear face of the liquid crystal panel 1.

Furthermore, the frame portion 161 holding the rim portion of the liquid crystal panel 1 is reinforced by the annular rib 165 disposed around the liquid crystal panel 1, and furthermore, the rib 165 is reinforced by the cylindrical bosses 166 molded integrally with a middle portion in the circumferential direction of the rib 165, and therefore, the rigidity of the frame portion 161 may be increased, resulting in protecting the liquid crystal panel 1.

Embodiment 7

Figure 22:
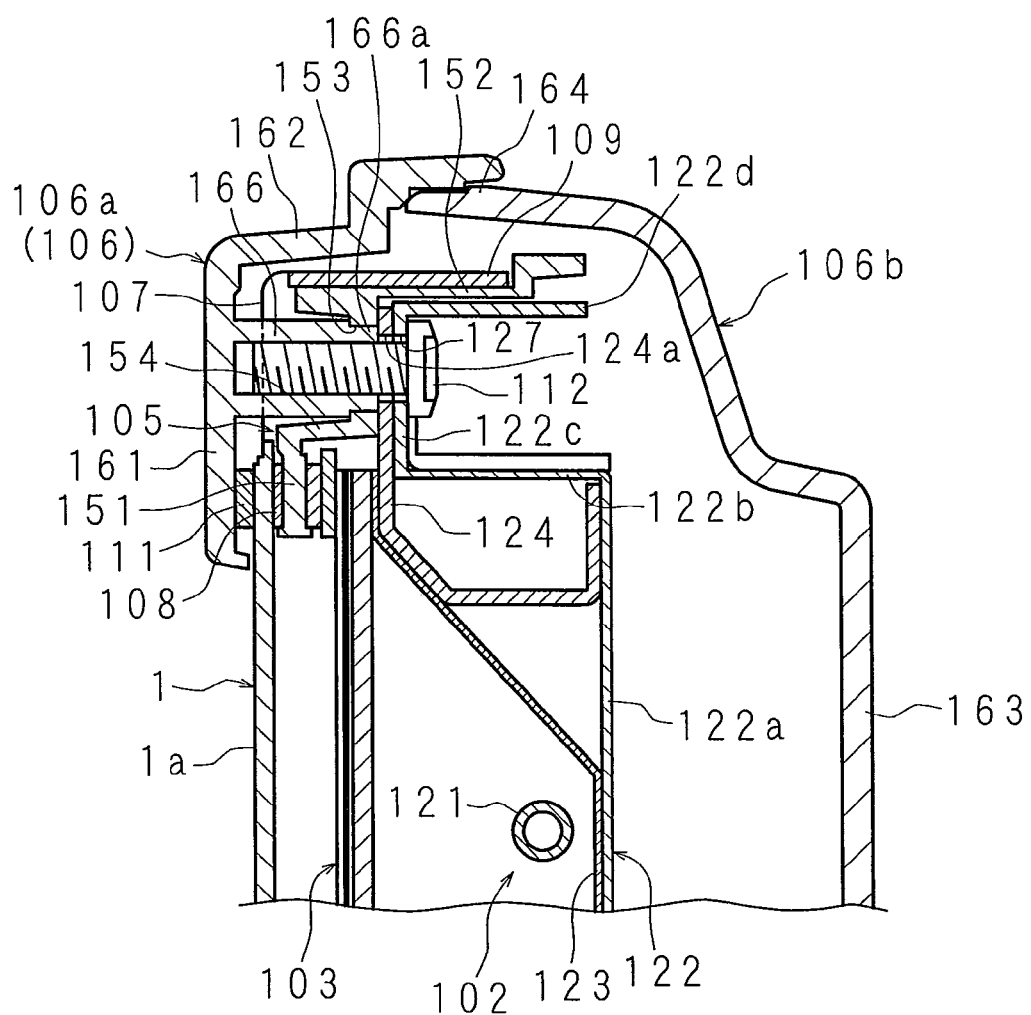
FIG. 22 is a partly omitted vertical side cross-sectional view illustrating a structure of a liquid crystal display device according to Embodiment 7 of the invention.
Figure 23:
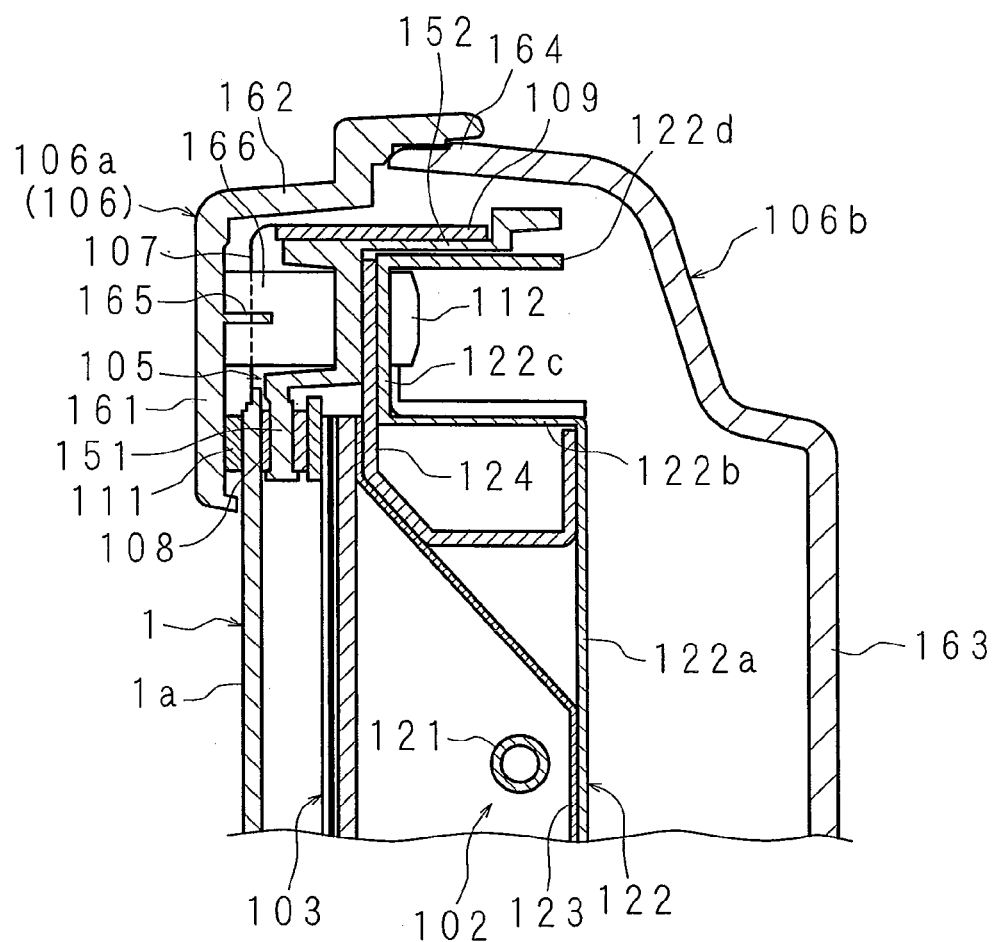
FIG. 23 is a vertical side cross-sectional view of the liquid crystal display device of Embodiment 7 of the invention taken on another cross section.

FIG. 22 is a partly omitted vertical cross-sectional view illustrating a structure of a liquid crystal display device according to Embodiment 7 of the invention, FIG. 23 is a vertical cross-sectional view taken on another cross section, and FIG. 24 is a perspective view illustrating a rib 165 and a cylindrical boss 166 used in the liquid crystal display device. In this liquid crystal device, the rib 165 and the cylindrical boss 166 described in Embodiment 6 are provided in a position opposing an annular plate portion 151 of a holding frame body 105 instead of the position outside the holding frame body 105, and an insertion hole 153 for inserting the cylindrical boss 166 is provided in the annular plate portion 151.

The rib 165 and the cylindrical boss 166 provided in the shape of a ring outside a liquid crystal panel 1 are molded integrally with a frame portion 161. The rib 165 has a cross section in a plate shape and has a length substantially equal to a distance between the frame portion 161 and the annular plate portion 151, and when the frame portion 161 is coupled with a casing 122, the end of the rib 165 is in contact with or opposes with a small gap from the annular plate portion 151, so as to substantially block a peripheral space between the frame portion 161 and the holding frame body 105.

The cylindrical boss 166 includes, as illustrated in FIG. 24, a base 166b continued to the frame portion 161 and the rib 165 and is extended in the backward direction from the end of the rib 165, and the thus formed extended portion 166a is inserted into the insertion hole 153. It is noted that the extended portion 166a corresponds to an insertion portion.

The holding frame body 105 includes the annular plate portion 151 in a rectangular shape opposing a rear face of the rim portion of the liquid crystal panel 1, and a frame portion 152 extending in the backward direction from the outer edge of the annular plate portion 151, and an outer edge portion of the annular plate portion 151 is deflected backward through a step portion 154, and the through hole 153 is formed in this deflected portion.

The casing 122 includes a rising portion 122b rising forward from the periphery of a rear wall 122a, a coupling plate portion 122c extending outward from the front end of the rising portion 122b, and a reinforcing wall 122d extending in the backward direction from the outer edge of the coupling plate portion 122c, and insertion holes 127 corresponding to the cylindrical bosses 166 are formed in a plurality of positions in the circumferential direction of the coupling plate portion 122c. Furthermore, a lamp holder is fixed on right and left portions on the inner face of the casing 122, and a receiving member 124 is fixed on upper and lower portions on the inner face. The lamp holder and a sheet receiver of the receiving member 124 extend outward, and insertion holes 124a corresponding to the cylindrical bosses 166 are formed in these extended portions. Moreover, an attaching piece having a plurality of screw holes is provided at the edge of the reinforcing wall 122d, so as to couple a cabinet rear part 106b with the casing 122 with male screws inserted into insertion holes of the cabinet rear part 106b and screwed into the screw holes.

The liquid crystal display device having the aforementioned structure is assembled through, for example, the following steps (1) through (5):

(1) The liquid crystal panel 1 is inserted into a cabinet front part 106a horizontally placed on a worktable with the frame portion 161 positioned on a lower side, so as to be placed on the frame portion 161, and the holding frame body 105 is placed above the liquid crystal panel 1. At this point, the cylindrical bosses 166 are inserted into the through holes 153, the rim portion of the liquid crystal panel 1 is sandwiched between the frame portion 161 and the annular plate portion 151, and the end of the rib 165 is in contact with the annular plate portion 151, so as to substantially block the peripheral space between the frame portion 161 and the holding frame body 105 on the peripheral side of the liquid crystal panel 1.

(2) An optical sheet 103 is placed above the annular plate portion 151 of the holding frame body 105, and the periphery of the optical sheet 103 is supported by the annular plate portion 151.

(3) A reflecting sheet 123 and lamps 121 are assembled within the casing 122 horizontally placed on a worktable with its opening facing upward, so as to form a light source part 102.

(4) The light source part 102 is turned round so as to have the opening of the casing 122 facing downward, and is placed above the optical sheet 103 while keeping this turned state. At this point, the insertion holes 127 of the coupling plate portion 122c and the receiving member 124 oppose the cylindrical bosses 166. The male screws 112 are inserted into the insertion holes 127, and the male screws 112 are screwed into the holes of the cylindrical bosses 166, so as to couple the cabinet front part 106a, the holding frame body 105 and the casing 122 with one another.

(5) Male screws are inserted into the insertion holes of the cabinet rear part 106b, and the male screws are screwed into the screw holes of the attaching piece, so as to couple the cabinet front part 106a, the light source part 102 and the cabinet rear part 106b with one another.

When the rim portion of the liquid crystal panel 1 is sandwiched between the frame portion 161 and the annular plate portion 151 of the holding frame body 105 in this manner, the rib 165 is in contact with the periphery of the annular plate portion 151 so as to substantially block, for the dust-proof effect, the peripheral space between the frame portion 161 and the holding frame body 105 on the peripheral side of the liquid crystal panel 1, and hence, dust having entered a cabinet 106 through a plurality of radiating holes formed on the cabinet rear part 106b can be prevented from proceeding through a space around the holding frame body 105 toward the liquid crystal panel 1, so as to prevent the dust from adhering onto the rear face of the liquid crystal panel 1.

Furthermore, the frame portion 161 holding the rim portion of the liquid crystal panel 1 is reinforced by the annular rib 165 disposed around the liquid crystal panel 1, and furthermore, the rib 165 is reinforced by the cylindrical bosses 166 molded integrally with a middle portion in the circumferential direction of the rib 165, and therefore, the rigidity of the frame portion 161 may be increased, resulting in protecting the liquid crystal panel 1.

Moreover, since the cylindrical bosses 166 formed integrally with the rib 165 are inserted into the through holes 153 formed in the annular plate portion 151 of the holding frame body 105, the size of the cabinet 106 against the display panel 1, and the size of the whole display device in its turn, may be smaller than in Embodiment 6.

The remaining structure and function are the same as those described in Embodiment 6, and hence, like reference numerals are used to refer to like elements so as to omit the detailed description and description of the function.

Embodiment 8

Figure 25:
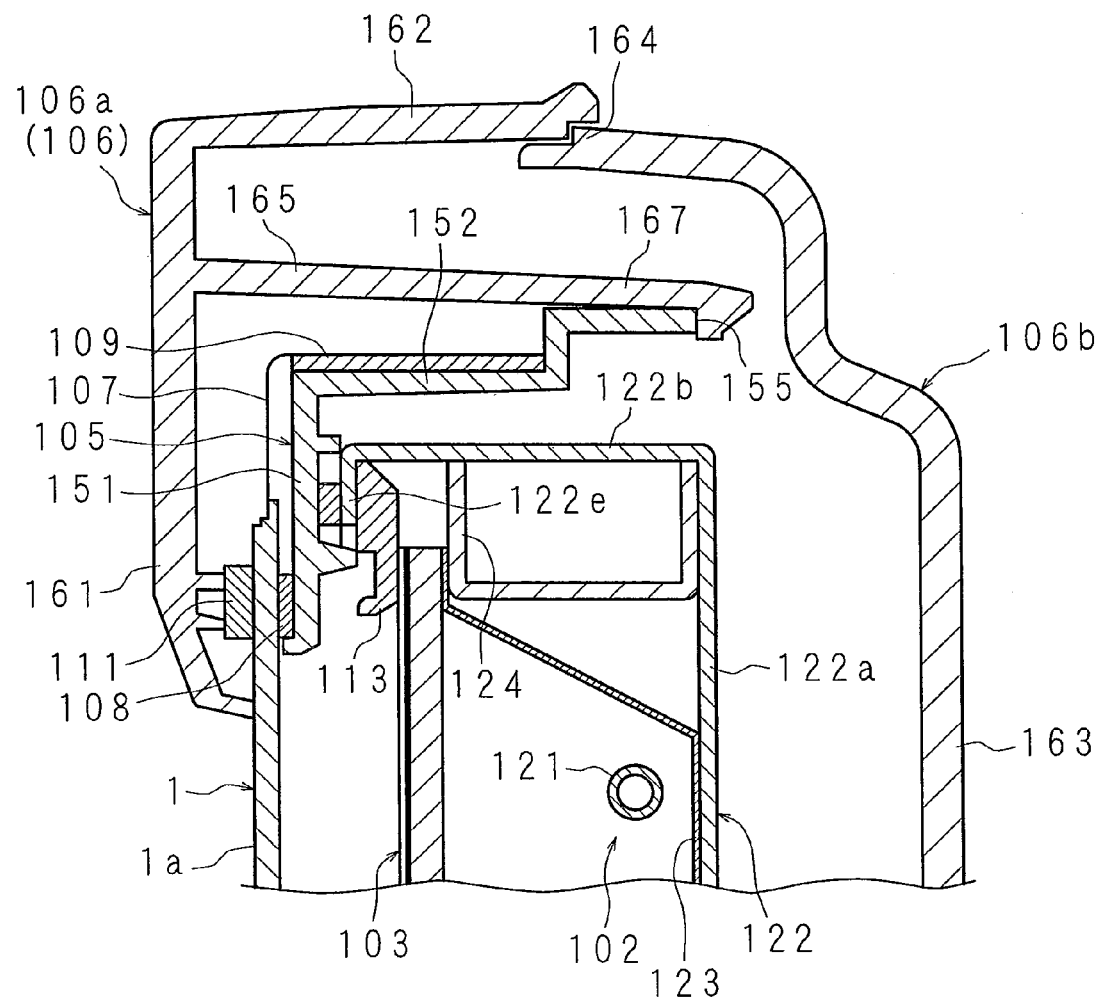
FIG. 25 is a partly omitted vertical side cross-sectional view illustrating a structure of a liquid crystal display device according to Embodiment 8 of the invention.
Figure 26:
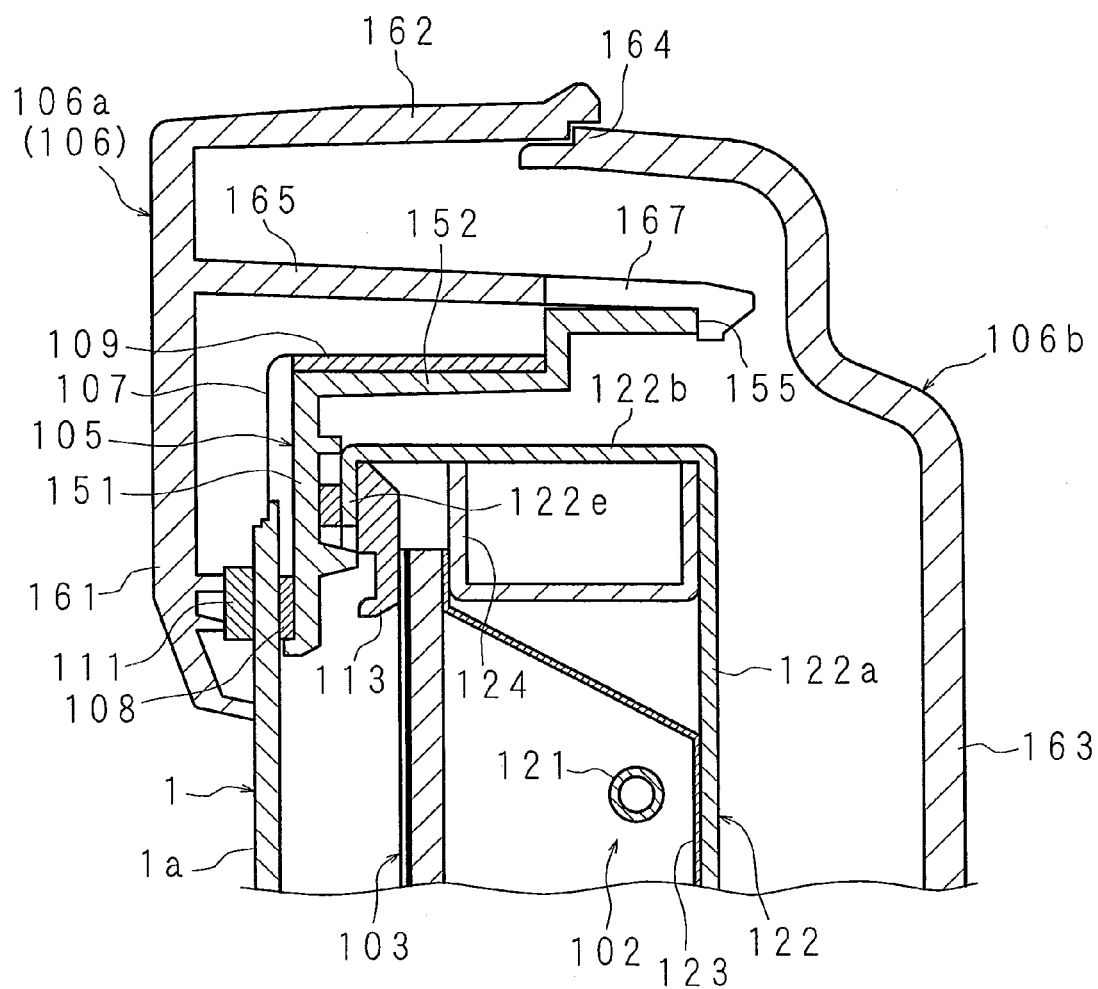
FIG. 26 is a vertical side cross-sectional view of the liquid crystal display device of Embodiment 8 of the invention taken on another cross section.

FIG. 25 is a partly omitted vertical cross-sectional view illustrating a structure of a liquid crystal display device according to Embodiment 8 of the invention, and FIG. 26 is a vertical cross-sectional view taken on another cross section. In this liquid crystal display device, a flexible engaging click 167 (coupling portion) is provided integrally with a rib 165 instead of the cylindrical boss 166 described in Embodiments 6 and 7, so as to hold a liquid crystal panel 1 without screwing a male screw.

The rib 165 provided in the shape of a ring outside the liquid crystal panel 1 has a plate-shaped cross section and is molded integrally with a frame portion 161, and the engaging clicks 167 extending in the backward direction are integrally molded in a plurality of positions in the circumferential direction of the rib 165. The engaging click 167 has a click at the tip of a flexible leg portion.

A holding frame body 105 includes a rectangular annular plate portion 151 opposing a rear face of a rim portion of the liquid crystal panel 1 and a frame portion 152 extending in the backward direction from the outer edge of the annular plate portion 151, and a plurality of attaching pieces having engaged portions 155 (coupled portion) corresponding to the engaging clicks 167 and screw holes are provided in a plurality of positions in the circumferential direction of the frame portion 152.

A casing 122 includes a rising portion 122b rising forward from the periphery of a rear wall 122a, and a receiving plate portion 122e extending inward from the front end of the rising portion 122b, a lamp holder is provided in right and left portions on the inner face of the casing 122, a receiving member 124 is provided in upper and lower portions on the inner face, the periphery of an optical sheet 103 is supported by the lamp holder and the receiving member 124, and a sheet pressing plate 113 is provided between the optical sheet 103 and the receiving member 124. Also, the annular plate portion 151 of the holding frame body 105 is supported by the receiving plate portion 122e. Furthermore, the casing 122 is provided with a plurality of attaching pieces extending outward from the periphery of the rear wall 122a, and insertion holes corresponding to screw holes of the holding frame body 105 and screw holes corresponding to insertion holes of a cabinet rear part 106b are formed in the attaching pieces.

The liquid crystal display device having the aforementioned structure is assembled through, for example, the following steps (1) through (5):

(1) A reflecting sheet 123 and lamps 121 are assembled within the casing 122 horizontally placed on a worktable with the opening facing upward, so as to form a light source part 102.

(2) The optical sheet 103 and the sheet pressing plate 113 are placed above the light source part 102, and the periphery of the optical sheet 103 is supported by the lamp holder and the receiving member 124.

(3) The liquid crystal panel 1 is inserted into a cabinet front part 106a, horizontally placed on a worktable with the frame portion 161 positioned on a lower side, to be placed on the frame portion 161, and the annular plate portion 151 of the holding frame body 105 is placed on the liquid crystal panel 1. At this point, the engaging clicks 167 of the frame portion 161 are engaged with the engaged portions 155 of the holding frame body 105, so as to couple the cabinet front part 106a and the holding frame body 105 with each other and hold the rim portion of the liquid crystal panel 1.

(4) The light source part 102 supporting the optical sheet 103 is turned round so as to have the optical sheet 103 on a lower side, and is placed above the annular plate portion 151 while keeping this turned state. At this point, male screws are inserted into insertion holes formed on the attaching pieces of the casing 122 and the male screws are screwed into the screw holes formed on the attaching pieces of the holding frame body 105, so as to couple the holding frame body 105 and the casing 122 with each other.

(5) Male screws are inserted into insertion holes of the cabinet rear part 106b, and the male screws are screwed into the screw holes of the attaching pieces of the casing 122, so as to couple the cabinet front part 106a, the casing 122 and the cabinet rear part 106b with one another In this embodiment, the rim portion of the liquid crystal panel 1 may be held without screwing male screws, and hence, the workability in the assembly may be improved and the cost may be further reduced. Moreover, since the engaging clicks 167 are provided instead of the cylindrical bosses 166, the size of the cabinet 106 against the display panel 1, and the size of the whole display device in its turn, may be smaller than in Embodiment 6.

The remaining structure and function are the same as those described in Embodiment 6, and like reference numerals are used to refer to like elements so as to omit the detailed description and description of the function.

Embodiment 9

Figure 27:
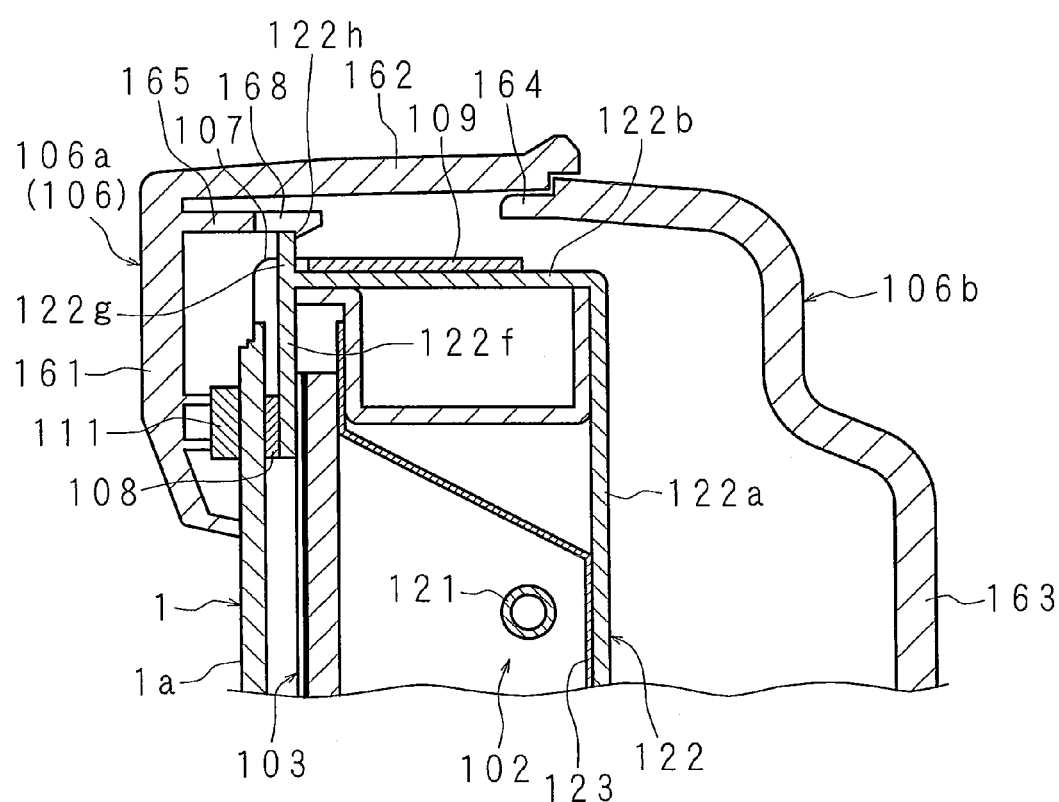
FIG. 27 is a partly omitted vertical side cross-sectional view illustrating a structure of a liquid crystal display device according to Embodiment 9 of the invention.

FIG. 27 is a partially omitted vertical cross-sectional view illustrating a structure of a liquid crystal display device according to Embodiment 9 of the invention. In this liquid crystal display device, the holding frame body 105 used in Embodiments 6 through 8 is eliminated and a casing 122 holds a rear side of a rim portion of a liquid crystal panel 1 and constitutes the holding member.

A rib 165 provided in the shape of a ring outside the liquid crystal panel 1 is molded integrally with a frame portion 161, and engaging clicks 168 (coupling portion) extending in the backward direction are integrally formed in a plurality of positions in a circumferential direction of the rib 165.

The casing 122 includes a rising portion 122b rising forward from the periphery of a rear wall 122a and a receiving plate portion 122f extending inward from the front end of the rising portion 122b, a lamp holder is provided in right and left portions on the inner face of the casing 122, a receiving member 124 is provided in upper and lower portions on the inner face, and the lamp holder and the receiving member 124 support the periphery of an optical sheet 103. Furthermore, the receiving plate portion 122f supports the rear side of the rim portion of the liquid crystal panel 1. Moreover, the rising portion 122b of the casing 122 is provided with a plurality of attaching pieces 122g extending outward, an engaged portion 122h (coupled portion) corresponding to each engaging click 168 is provided on each attaching piece 122g, and the periphery of the rear wall 122a is provided with an attaching piece having screw holes corresponding to insertion holes of a cabinet rear part 106b.

In this display device, since the rim portion of the liquid crystal panel 1 may be held without screwing male screws, the workability in the assembly may be improved and the cost may be further reduced. Furthermore, since the engaging click 168 is provided instead of the cylindrical bosses 166, the size of a cabinet 106 against the display panel 1, and the size of the whole display device in its turn, may be smaller than in Embodiment 6.

The remaining structure and function are the same as those described in Embodiment 6, and hence, like reference numerals are used to refer to like elements so as to omit the detailed description and description of the function.

Although the cabinet front part 106a including the frame portion 161 and the rectangular tubular portion 162 is used in each of Embodiments 6 through 9 described above, the cabinet front part 106a may include the frame portion 161 alone without using the rectangular tubular portion 162. In this case, the rectangular tubular portion 164 of the cabinet rear part 106b is extended to the frame portion 161.

Although the rib 165 is in the shape of a ring in each of Embodiments 6 through 9 described above, the rib 165 may be in another shape including a cylindrical shape with a part in the circumferential direction eliminated or a cylindrical shape divided in the circumferential direction.

Although the display device of the invention is applied to the structure for supporting a liquid crystal panel of a liquid crystal display device in each of Embodiments 1 through 9 described above, the invention is applicable to a case where a display panel is housed and held within a cabinet in a self-luminous type slim display device such as a PDP (plasma display panel), an organic EL (electroluminescence) television, an SED (surface-conduction electron-emitter display) television or an LED (light emitting diode) display.

The invention claimed is:

1. A display device comprising:
   a cabinet including a frame part being disposed on a first face side corresponding to a display face of a display panel and having an opening, a peripheral part connected to an outer periphery of the frame part and positioned so as to cover peripheral faces of display panel, and a rear part connected to the peripheral part and covering a second face side of the display panel;
   the display panel disposed within the cabinet and held from both sides thereof by the frame part and a holding member supported on the peripheral part or the rear part;
   a projecting portion that projects inside the frame part, disposed outside a rim portion of the display panel and the holding member and extends from the first face side toward the second face side, wherein the projecting portion is an annular projection provided continuously outside the rim portion of the display panel; and
   a reinforcing portion that is disposed only inside the projecting portion and couples the projecting portion with an interior of the frame part.

2. The display device according to claim 1, wherein the projecting portion extends in a direction substantially perpendicular to an inner face of the frame part, and the reinforcing portion is a plate portion substantially perpendicular to the projecting portion and the inner face of the frame part.

3. The display device according to claim 1, wherein the reinforcing portion is provided inside the projecting portion.

4. The display device according to claim 1, wherein the holding member is a frame body having an opening for transmitting light for irradiating the display panel and holding the rim portion of the display panel from the second face side.

5. The display device according to claim 4, wherein the frame body includes, in an outer peripheral portion thereof, a receiving portion for a circuit board used for driving the display panel.

* * * * *